United States Patent [19]

Shustorovich

[11] Patent Number: 5,912,986
[45] Date of Patent: Jun. 15, 1999

[54] EVIDENTIAL CONFIDENCE MEASURE AND REJECTION TECHNIQUE FOR USE IN A NEURAL NETWORK BASED OPTICAL CHARACTER RECOGNITION SYSTEM

[75] Inventor: Alexander Shustorovich, Rochester, N.Y.

[73] Assignee: Eastman Kodak Company, Rochester, N.Y.

[21] Appl. No.: 08/361,391

[22] Filed: Dec. 21, 1994

Related U.S. Application Data

[63] Continuation-in-part of application No. 08/263,304, Jun. 21, 1994.

[51] Int. Cl.$^6$ ...................................................... G06K 9/62
[52] U.S. Cl. ........................................... 382/156; 382/228
[58] Field of Search ..................................... 382/155, 156, 382/159, 160, 224, 228; 395/22

[56] References Cited

U.S. PATENT DOCUMENTS

| | | | |
|---|---|---|---|
| 4,918,618 | 4/1990 | Tomlinson | 364/513 |
| 4,933,977 | 6/1990 | Ohnishi et al. | 382/9 |
| 5,052,043 | 9/1991 | Goborski | 382/14 |
| 5,105,468 | 4/1992 | Guyon et al. | 382/14 |
| 5,119,438 | 6/1992 | Ueda et al. | 382/14 |
| 5,131,073 | 7/1992 | Euruta et al. | 395/27 |
| 5,151,951 | 9/1992 | Ueda et al. | 382/19 |
| 5,155,801 | 10/1992 | Lincoln | 395/22 |
| 5,214,746 | 5/1993 | Fogel et al. | 395/23 |
| 5,239,593 | 8/1993 | Wittner et al. | 382/14 |
| 5,245,672 | 9/1993 | Wilson et al. | 382/9 |
| 5,299,269 | 3/1994 | Gaborski et al. | 382/9 |
| 5,392,594 | 2/1995 | Yoda | 382/15 |
| 5,465,308 | 11/1995 | Hutcheson et al. | 382/159 |

OTHER PUBLICATIONS

Barnett, Computational methods for a mathematical theory of evidence, 1981, pp. 868–875.

J.A. Barnett, "Computational Methods for a Mathematical Theory of Evidence", *Proceedings of the Seventh International Joint Conferences on Artificial Intelligence*, Vancouver, British Columbia, 1981, pp. 868–875.

R. Battiti et al., "Democracy in Neural Nets: Voting Schemes for Classification", *Neural Networks*, vol. 7, No. 4, 1994, pp. 691–707.

Y. Bengion et al., "Globally Trained Handwritten Word Recognizer using Spatial Representation, Covolutional Neural Netowrks and Hidden Markov Models", *Proceedings of 1993 Confierence on Neural Information Processing Systems—Natural and Synthetic*, Nov. 29–Dec. 2, 1993, Denver Colorado, pp. 937–944.

(List continued on next page.)

*Primary Examiner*—Joseph Mancuso
*Assistant Examiner*—Timothy M. Johnson
*Attorney, Agent, or Firm*—Nelson A. Blish; Peter L. Michaelson

[57] ABSTRACT

Apparatus, and an accompanying method, for use in, e.g., a neural network-based optical character recognition (OCR) system (5) for accurately classifying each individual character extracted from a string of characters, and specifically for generating a highly reliable confidence measure that would be used in deciding whether to accept or reject each classified character. Specifically, a confidence measure, associated with each output of, e.g., a neural classifier (165), is generated through use of all the neural activation output values. Each individual neural activation output provides information for a corresponding atomic hypothesis of an evidence function. This hypothesis is that a pattern belongs to a particular class. Each neural output is transformed (1650) through a pre-defined monotonic function into a degree of support in its associated evidence function. These degrees of support are then combined (1680, 1690) through an orthogonal sum to yield a single confidence measure associated with the specific classification then being produced by the neural classifier.

17 Claims, 22 Drawing Sheets

OTHER PUBLICATIONS

J. Bromely et al., "Improving Rejection Performance on Handwritten Digits by Training with 'Rubbish'", *Neural Computation,* vol. 5, 1993 (367–370).

J. Daugman, "Complete Discrete 2–D Gabor Transforms by Neural Networks for Image Analysis and Compression", *IEEE Transactions on Acoustics, Speech and Signal Processing,* 1988, vol. 36, No. 7, pp. 1169–1179.

J.A. Freeman et al., *Neural Networks—Algorithms, Applications and Programming Techniques,* pp. 89–125 (1991: Addison–Welsey Publishing Company, Inc.).

A. Gupta et al., "An Integrated Architecture for Recognition of Totally Unconstrained Handwritten Numerals", *International Journal of Pattern Recognition and Artificial Intelligence,* 1993, vol. 7, No. 4, pp. 757–773.

J. Keeler et al., "A Self–Organizing Integrated Segmentation and Recognition Neural Net", appears in J.E. Moody et al. (eds.), *Advances in Neural Information Processing Systems,* 1992, vol. 4, pp. 496–503 (Morgan Kaufmann Publishers, San Mateo, California).

G. Martin et al., "Learning to See Where and What: Training a Net to Make Saccades and Recognize Handwritten Characters" (1993), appears in S.J. Hanson et al. (eds.), *Advances in Neural Information Processing Systems,* vol. 5, pp. 441–447 (Morgan Kaufmann Publ., San Mateo, CA).

D.E. Rumelhart et al., *Parallel Distributed Processing,* vol. 1, pp. 328–330 (1988, MIT Press).

G. Shafer, *A Mathematical Theory of Evidences,* (1976: Princeton University Press), specifically pp. 3–78.

A. Shustorovich, "A Subspace Projection Approach to Feature Extraction: The Two–Dimensional Gabor Transform for Character Recognition" appeared in *Neural Networks,* 1994, vol. 7, No. 8.

F.F. Soulie et al., "Multi–Modular Neural Network Architectures: Applications in Optical Character and Human Face Recognition", *International Journal of Pattern Recognition and Artificial Intelligence,* vol. 7, No. 4, 1993, pp. 721–755, specifically pp. 728–729.

Original Image
Detected Sub-Images
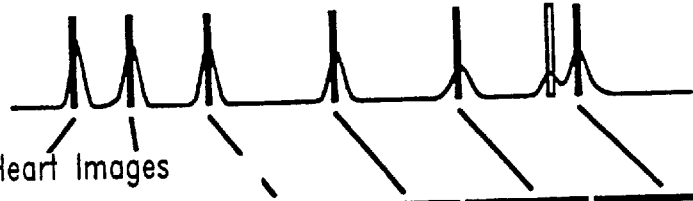
Scaled Sub-Images
Character Heart Index Waveform
Detected Character Hearts
Character Heart Images
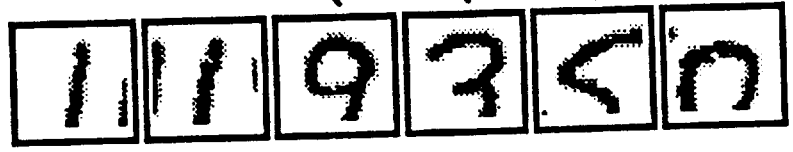
Character Labels
1   1   9   3   5   0
FIG. 3F

FIG. 11 POSITIONING ERROR DISTRIBUTIONS
| | False Alarm | Misses | \multicolumn{9}{c}{Positioning Error Distribution (%)} |
|---|---|---|---|---|---|---|---|---|---|---|---|
| | | | -4 | -3 | -2 | -1 | 0 | 1 | 2 | 3 | 4 |
| Saccade | 0.5 | 1.0 | 1.3 | 4.7 | 15.3 | 32.4 | 30.0 | 12.2 | 2.2 | 0.7 | 0.2 |
| SYSTEM 5 | 0.0 | 0.2 | 0.3 | 1.1 | 6.8 | 33.0 | 39.9 | 15.5 | 2.3 | 0.7 | 0.2 |
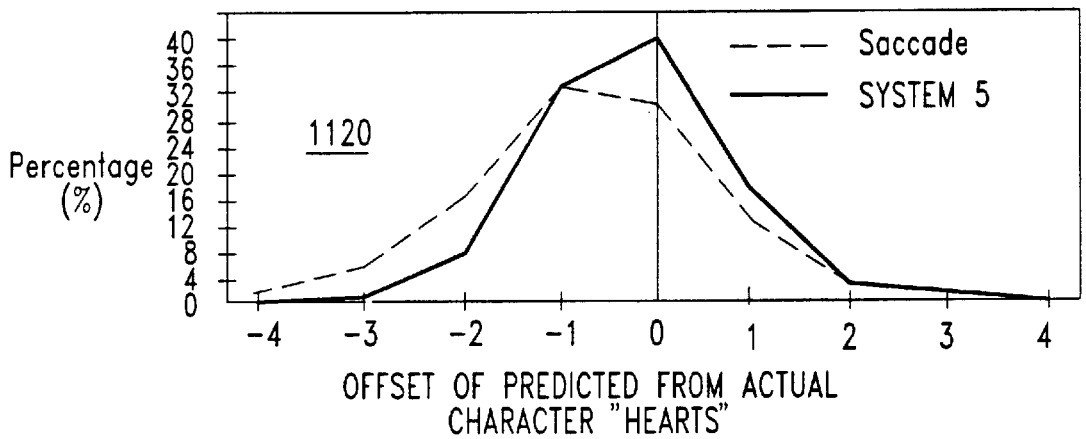
OFFSET OF PREDICTED FROM ACTUAL CHARACTER "HEARTS"
FIG. 12 CLASSIFICATION ERROR DISTRIBUTIONS
| | Percent Correct | | |
|---|---|---|---|
| Offset | Saccade | SYSTEM 5 | Error Reductions |
| -2 | 91.8% | 96.5% | 57% |
| -1 | 95.7% | 97.5% | 41% |
| 0 | 96.0% | 97.7% | 42% |
| 1 | 95.3% | 97.5% | 46% |
| 2 | 87.6% | 96.7% | 73% |
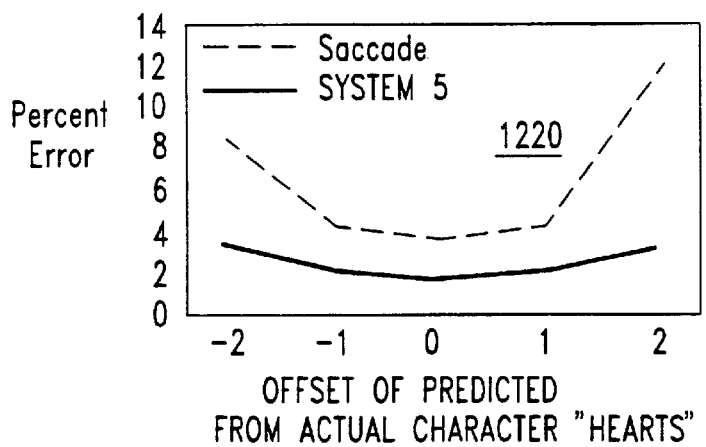
OFFSET OF PREDICTED FROM ACTUAL CHARACTER "HEARTS"

FIG. 13

- $m_2(Y_m)$
- $m_2(Y_j)$ — probability mass, of measure $m_1(X_i) \cdot m_2(Y_j)$, committed to $X_i \cap Y_j$
- $m_2(Y_1)$ $m_1(X_1) \cdots m_1(X_j) \cdots m_1(X_2)$

FIG. 14

| | $m_1(\Theta_1)=\phi_1$ | $m_1(\Theta)=1-\phi_1$ |
|---|---|---|
| $m_2(\Theta)=1-\phi_2$ | $\Theta_1 : \phi_1 \cdot (1-\phi_2)$ | $\Theta : (1-\phi_1) \cdot (1-\phi_2)$ |
| $m_2(\Theta_2)=\phi_2$ | $\emptyset : \phi_1 \cdot \phi_2$ | $\Theta_2 : (1-\phi_1) \cdot \phi_2$ |

| $m_{(n)}(\Theta)=K$ | $\Theta_{n+1}:K\cdot\phi_{n+1}$ | $\Theta:K\cdot(1-\phi_{n+1})$ |
|---|---|---|
| $m_{(n)}(\Theta_n)=K\cdot\alpha_n$ | $\emptyset$ | $\Theta:K\cdot\alpha_n\cdot(1-\phi_{n+1})$ |
| . . . . . . . . . . . . | $\emptyset$ | . . . . . . . . . . . . |
| $m_{(n)}(\Theta_2)=K\cdot\alpha_2$ | $\emptyset$ | $\Theta:K\cdot\alpha_2\cdot(1-\phi_{n+1})$ |
| $m_{(n)}(\Theta_1)=K\cdot\alpha_1$ | $\emptyset$ | $\Theta:K\cdot\alpha_1\cdot(1-\phi_{n+1})$ |

$\phi_{n+1}$ $m_{n+1}(\Theta_{n+1})=\phi_{n+1}$   $m_{n+1}(\Theta)=1-\phi_{n+1}$

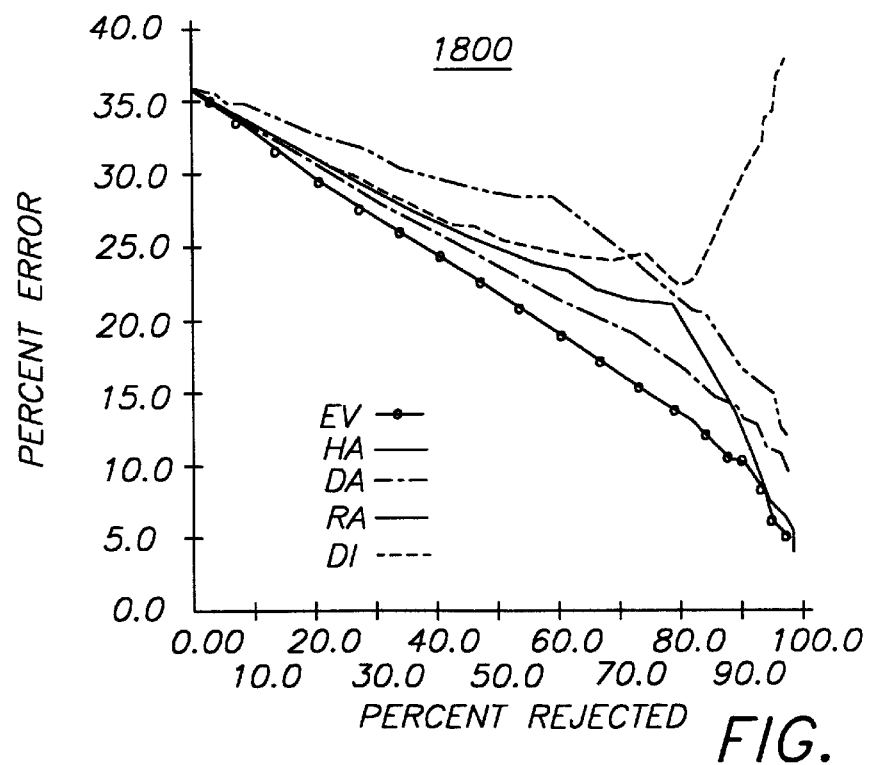

FIG. 18

EVIDENTIAL CONFIDENCE MEASURE AND REJECTION TECHNIQUE FOR USE IN A NEURAL NETWORK BASED OPTICAL CHARACTER RECOGNITION SYSTEM

CROSS-REFERENCE TO RELATED APPLICATION

This application is a continuation-in-part of my copending United States patent application entitled "NEURAL NETWORK BASED CHARACTER POSITION DETECTOR FOR USE IN OPTICAL CHARACTER RECOGNITION", filed Jun. 21, 1994 and assigned Ser. No. 08/263,304.

TECHNICAL FIELD OF THE INVENTION

The invention relates to apparatus, and an accompanying method, for use in, e.g., a neural network-based optical character recognition (OCR) system for accurately classifying each individual character extracted from a string of characters, and specifically for generating a highly reliable confidence measure that would be used in deciding whether to accept or reject each classified character.

BACKGROUND ART

Through the use of word processors and/or other data processing and computerized office equipment, the number of paper documents, particularly forms, of one kind or another that are currently in use has simply exploded over the past few decades. At some point, the information on most of these documents must be extracted therefrom and processed in some fashion.

For example, one document that is in wide use today is a paper bank check. A payor typically fills in, either by hand or through machine, a dollar amount on an appropriate line of the check and presents the check to its recipient. The recipient deposits the check in its bank. In order for this bank to process the check for payment, a human operator employed by the bank reads the amount on the check and instructs a printer to place appropriate digits on the bottom of the check. These digits and similar electronic routing codes situated on the bottom of the check are subsequently machine read to initiate an electronic funds transfer through a banking clearinghouse from the payor's account at its bank (i.e. the paying bank) to the recipient's account at its bank (the presenting bank) and to physically route the check back through the clearinghouse from the presenting bank to the payor bank for cancellation. Inasmuch as the number of checks has been and continues to substantially increase over the past few years, the cost to banks of processing paper checks has been steadily increasing. In an effort to arrest these cost increases or at least temper their rise, banks continually attempt to bring increasing levels of machine automation to the task of processing checks. Specifically, various individuals in banking believe that if the check encoding process were automated by replacing human operators with appropriate optical character recognition (OCR) systems, then the throughput of encoded checks and encoding accuracy will both substantially increase while significant concomitant cost savings will occur. As envisioned, such systems would scan the writing or printing that appears on each check, accurately translate a scanned dollar amount into digital signals, such as appropriate ASCII words, and, inter alia, operate a printer to print appropriate numeric characters onto the bottom of each check in order to encode it.

With the ever expanding amount of paper documents in use in present day society—of which paper checks represent only one illustrative example, the human resources needed to read these documents and convert their contents into machine readable form or directly into computer data are simply becoming either unavailable or too costly to use. As such, a substantial need exists, across many fields, to develop and use OCR systems to accurately automate the process of recognizing and translating first machine printed alphanumeric characters and ultimately handwritten characters into appropriate digital data.

For various reasons not relevant here, starting several years ago and continuing to the present, neural networks are seen in the art as a preferred technique for providing accurate character recognition in an OCR system.

In contrast to traditional sequential "Von Neumann" digital processors that operate with mathematical precision, neural networks are generally analog—though digital implementations are increasingly common, and typically manifest massively parallel processing. These networks provide fast and often surprisingly good output approximations, but not precise results, by making weighted decisions on the basis of fuzzy, incomplete and/or frequently contradictory input data.

By way of background, a neural network is basically a configuration of identical processing elements, so-called neurons, that are arranged in a multi-layered hierarchical configuration. Each neuron can have one or more inputs, but only one output. Each input is weighted by a coefficient. The output of a neuron is typically calculated as a function of the sum of its weighted inputs and a bias value. This function, the so-called activation function, is typically a "sigmoid" function; i.e., it is S-shaped, monotonically increasing and asymptotically approaches fixed values typically +1, and zero or −1 as its input respectively approaches positive or negative infinity. The sigmoid function and the individual neural weight and bias values determine the response or "excitability" of the neuron to signals presented to its inputs. The output of a neuron in one layer is distributed as input to neurons in a higher layer. A typical neural network contains at least three distinct layers: an input layer situated at the bottom of the network, an output layer situated at the top of the network and one or more hierarchical interconnected hidden layers located intermediate between the input and output layers. For example, if a neural network were to be used for recognizing normalized alphanumeric characters situated within a 7×5 pixel array, then the output of a sensor for each pixel in that array, such as a cell of an appropriate charge coupled device (CCD), is routed as input to a different neuron in the input layer. Thirty-five different neurons, one for each different pixel, would exist in this layer. Each neuron in this layer has only one input. The outputs of all of 35 neurons in the input layer are distributed, in turn, as input to the every neuron in, e.g., a single intermediate or so-called hidden layer. The output of each of the neurons in the hidden layer is distributed as an input to every neuron in the output layer. The number of neurons in the output layer typically equals the number of different characters that the network is to recognize, i.e., classify, with the output of each such neuron corresponding to a different one of these characters. The numerical outputs from all the output layer neurons form the output of the network. For example, one output neuron may be associated with the letter "A", another with the letter "B", a third with the letter "a", a fourth with the letter "b" and so on for each different alphanumeric character, including letters, numbers, punctuation marks and/or other desired symbols, if any, that is to be recognized by the network. The number of neurons in this single hidden layer, as well as the number of separate hidden layers that is used in the network, depends, inter alia, upon the complexity of the character bit-maps to be presented to the network for recognition; the desired information capacity of the network; the degree to which the network, once trained, is able to handle unfamiliar patterns; and the number of iterations that the network must undergo during training in order for all the network weight and bias values to properly converge. If the network were to utilize several separate hidden layers, then the output from each neuron in the first (i.e. lowest) hidden layer would feed the inputs to the neurons in the second (i.e. next higher) hidden layer and so forth for the remaining hidden layers. The output of the neurons in the last (i.e. highest) hidden layer would feed the neural inputs in the output layer. The output of the network typically feeds a processor or other circuitry that converts the network output into appropriate multi-bit digital data, e.g., ASCII characters, for subsequent processing.

The use of a neural network generally involves two distinct successive procedures: initialization and training on known pre-defined patterns having known outputs, followed by recognition of actual unknown patterns.

First, to initialize the network, the weights and biases of all the neurons situated therein are set to random values typically within certain fixed bounds. Thereafter, the network is trained. Specifically, the network is successively presented with pre-defined input data patterns, i.e., so-called training patterns. The values of the neural weights and biases in the network are simultaneously adjusted such that the output of the network for each individual training pattern approximately matches a desired corresponding network output (target vector) for that pattern. Once training is complete, all the weights and biases are then fixed at their current values. Thereafter, the network can be used to recognize unknown patterns. During pattern recognition, each unknown pattern is applied to the inputs of the network and resulting corresponding network responses are taken from the output nodes. Ideally speaking, once the network recognizes an unknown input pattern to be a given character on which the network was trained, then the signal produced by a neuron in the output layer and associated with that character should sharply increase relative to the signals produced by all the other neurons in the output layer.

One technique commonly used in the art for adjusting the values of the weights and biases of all the neurons during training is back error propagation (hereinafter referred to simply as "back propagation"). Briefly, this technique involves presenting a pre-defined input training pattern (input vector) to the network and allowing that pattern to be propagated forward through the network in order to produce a corresponding output pattern (output vector, O) at the output neurons. The error associated therewith is determined and then back propagated through the network to apportion this error to individual weights in the network. Thereafter, the weights and bias for each neuron are adjusted in a direction and by an amount that minimizes the total network error for this input pattern.

Once all the network weights have been adjusted for one training pattern, the next training pattern is presented to the network and the error determination and weight adjusting process iteratively repeats, and so on for each successive training pattern. Typically, once the total network error for each of these patterns reaches a pre-defined limit, these iterations stop and training halts. At this point, all the network weight and bias values are fixed at their then current values. Thereafter, character recognition on unknown input data can occur at a relatively high speed.

During character recognition, a "winner take all" approach is generally used to identify the specific character that has been recognized by the network. Under this approach, once the network has fully reacted to an input data pattern, then the one output neuron that generates the highest output value relative to those produced by the other output neurons is selected, typically by a processing circuit connected to the network, as the network output. Having made this selection, the processor then determines, such as through a simple table look-up operation, the multi-bit digital representation of the specific character identified by the network.

Neural network based OCR systems have exhibited excellent performance characteristics with machine printed text, particularly "clean" text that exhibits a high degree of uniformity, in terms of line thickness and orientation, from one character to the next. Unfortunately, the task of recognizing characters, even through the use of a neural network, is complicated by the existence of touching or otherwise overlapping characters. While a very small number of machine printed characters actually touch, due to kerning and the like, touching and overlapping characters are particularly prevalent with handwritten text and numerals, effectively exhibiting, due to human variability, an infinite number of variations. Clearly, for the sake of efficiency and implementation simplicity, a neural network can not be trained to recognize even a major portion, let alone all, of these variations.

As noted above, a neural network classifier typically employs as many different output nodes as there are differing characters to recognize, with one node allocated to each different character. Once such a network is trained to recognize a given character, whenever a bit-mapped pattern for that character is applied, as input, to the network, the network will produce a relatively high level output activation at the output node associated with that character and relatively low output activations at all other output nodes. Accordingly, the "best guess" produced by the network is the character associated with the node that presents the highest output activation. Since neural networks produce so-called "soft" decisions, i.e., decisions having some degree of inherent uncertainty, to assure that only reliable decisions are used, a confidence measure is generally determined for each such decision. Those decisions that have relatively high confidence measures, typically equal to or in excess of a pre-defined threshold level, are accepted and subsequently used; while those with correspondingly low confidence measures, i.e., less than the threshold level, are rejected and discarded. Generally, the desired level of reliability determines the numeric value of the threshold level.

In an effort to greatly simplify the task of recognizing human handwriting, the art teaches the use of determining those characters which touch and then segmenting or otherwise partitioning these characters apart and recognizing each character that results. In this regard, the art teaches two basic approaches: performing segmentation prior to character recognition, or simultaneously performing both segmentation and recognition.

One example of the former pre-recognition segmentation approach is the system disclosed in U.S. Pat. No. 5,299,269 (issued to R. S. Gaborski et al on Mar. 29, 1994 and assigned to the present assignee hereof, also referred to herein as the 269 patent). Here, a sliding window is stepped across an image field, on a pixel-by-pixel basis, to capture a sub-image, i.e., a kernel of the image. An associate memory or neural network is trained, through one training set, to recognize all non-character images that can exist within the sub-image, i.e., all possible intersections and combinations of known characters that correspond to window positions that straddle adjacent characters. This training includes window-captured sub-images that in the past were incorrectly perceived as being centered on a character when in fact they were not, i.e., the result of false character segmentation. The same memory or network, or a second one, is trained, through a second training set, to recognize the individual "non-straddling" characters of a given character set. If one item of the training sets is recognized, then the entire sub-image is forwarded to a downstream portion of an OCR system for further character recognition. For this particular system to properly function, the appropriate memory or network must be trained on all possible non-character images. Unfortunately, a very large, potentially infinite, number of such images can exist. Hence, if a training sequence is to encompass a substantial number, even if considerably much less than all such, non-character images, then the accuracy with which any one of these images will be recognized will be reduced. Furthermore, as the number of different characters which a network (or memory) must recognize increases, the size and complexity of that network (or memory) increases at a considerably greater rate. Hence, the system disclosed in the 269 patent is rather impractical.

Another example of the pre-recognition segmentation approach is described in A. Gupta et al, "An Integrated Architecture for Recognition of Totally Unconstrained Handwritten Numerals", *International Journal of Pattern Recognition and Artificial Intelligence*, 1993, Vol. 7, No. 4, pages 757–773. Here, once an image is scanned, typically to implement machine recognition of a handwritten zip code, a resulting digital binary bit-map of a source document, such as an envelope, is passed through a preprocessing stage which performs segmentation, thinning and rethickening (the latter two functions to impart uniform thickness to otherwise differing stroke thicknesses among different characters) as well as character size normalization and slant correction. Character recognition is then performed on a resulting preprocessed bit-map. By reducing differences among resulting characters, the complexity of the recognition stage, particularly the neural network used therein, would be considerably reduced. However, the pre-recognition segmentation approach has exhibited, on an empirical basis, quite some difficulty in accurately separating touching characters.

Consequently, as a result of this difficulty among other reasons, the art is turning to a combined segmentation-recognition approach. This latter approach typically involves moving a window, e.g., a so-called "sliding" window, of a certain width across a field and fabricating confidence measures for competing character classifications to determine if the window is positioned directly on top of character as well as to undertake recognition of that character. A combined segmentation/recognition approach is described, for example, in Martin et al, "Learning to See Where and What: Training a Net to Make Saccades and Recognize Handwritten Characters" (1993) [hereinafter referred to as the "Martin et al" publication], appears in S. J. Hanson et al (eds.), *Advances in Neural Information Processing Systems*, Volume 5, pages 441–447 (Morgan Kaufmann Publishers, San Mateo, Calif.). Here, a system (which, for convenience, will henceforth be referred to herein as the "Saccade" system) is described in which a four-layer neural network (i.e. with two hidden layers) is trained, using back propagation, not only to locate and recognize characters, by class, in the center of a window (as well as whether a character exists in the window or not) but also to make corrective jumps, i.e., so-called "saccades", to the nearest character, and after its recognition, to the next character and so forth. Unfortunately, this system tends to miss relatively narrow characters and occasionally duplicates relatively wide characters, thereby reducing overall recognition accuracy. Another combined segmentation/recognition approach, is described in Bengio et al, "Globally Trained Handwritten Word Recognizer using Spatial Representation, Convolutional Neural Networks and Hidden Markov Models", Proceedings of 1993 Conference on Neural Information Processing Systems—Natural and Synthetic. Nov. 29–Dec. 2. 1993. Denver, Colo., pages 937–944. This approach relies on using a multi-layer convolution neural network with multiple, spatially replicated, sliding windows displaced by a one or several pixel shift with respect to each other along the scanning direction. The outputs of corresponding neural classifiers serve as input to a post-processing module, specifically a hidden Markov model, to decide which one of the windows is centrally located over a character. This approach provides a neural output indicating whether the character is centered within a window or not. Unfortunately, this particular approach of replicating a neural classifier when viewed with the need for post-processing, tends to be quite expensive computationally, relatively slow and thus impractical.

Now, apart from the problems associated with conventional approaches to segmentation, neural based classification, as conventionally taught, is also problematic.

In particular, confidence of a neural decision should increase with either a measured increase in the value of the highest output activation for that decision or a measured numeric increase in a gap, in output activation values, between the highest output activation, i.e., for that decision, and a second highest output activation.

The art teaches several different schemes to determine a confidence measure for neural output activations. Typically, these schemes involve using either one or some combination of both conventional measurements to assess confidence. For example, in R. Battiti et al, "Democracy in Neural Nets: Voting Schemes for Classification", *Neural Networks*, Vol. 7, No. 4, 1994, pages 691–707, a neural network classifier is described that relies on accepting those decisions which have a highest output activation value (referred to hereinafter as simply the "HA" scheme) that exceeds a pre-defined fixed threshold, thres_max, and a difference in activation (referred to hereinafter as simply the "DA" scheme) between the two highest output activations that exceeds a second pre-defined threshold, thres_diff. Similarly, another neural classifier, as described in the Martin et al publication, just relies on using thresholded activation differences (i.e. the DA scheme) to reject neural decisions. Use of the DA scheme in a neural classifier is also evident in J. Bromley et al, "Improving Rejection Performance on Handwritten Digits by Training with 'Rubbish'", *Neural Computation*, Vol. 5, 1993, pages 367–370. Alternatively, U.S. Pat. No. 5,052, 043 (issued Sep. 24, 1991 to R. S. Gaborski and also assigned to the present assignee hereof) teaches a neural classifier in which a confidence measurement, for a neural decision, is formed as a ratio of the highest and second highest output activation values associated with that decision (referred to hereinafter as simply the "RA" approach). Another scheme, as proposed in F. F. Soulie et al, "Multi-Modular Neural Network Architectures: Applications in Optical Character and Human Face Recognition", *International Journal of Pattern Recognition and Artificial Intelligence*, Vol. 7, No. 4, 1993, pages 721–755, specifically pages 728–729 thereof, teaches a neural classifier that utilizes a distance based rejection criteria (referred to as "DI"

scheme). Here, in addition to employing the HA and DA schemes, Euclidean distances between an activation vector and target activation vectors of all potential output classes are compared to a fixed threshold. If the smallest of these distances is less than the threshold, then the proposed classification is rejected.

Ambiguities usually exist between a correct output classification, i.e., the "best guess", and one other prominent alternative, i.e., a "next best guess". One would expect that the two highest output activations corresponding to these two alternatives should provide most of the necessary information upon which to assess confidence and hence base rejection of a neural decision. In this case, the HA, DA, RA or DI rejection schemes, can result in an acceptable choice between two competing output classifications. Still, various situations exist when a choice must be made among three or more classifications, including for digit recognition, where these simple rejection schemes prove to be inadequate.

Therefore, a general and still unsatisfied need exists in the art for an OCR system that is capable of accurately and efficiently recognizing handwritten characters.

In furtherance of meeting this general need, a relatively simple and fast, yet accurate apparatus (and an accompanying method), particularly suited for inclusion within an OCR system is required to properly locate each character (or other object), that is to be recognized, from within a field of such characters as well as, through an appropriate neural network, to reliably classify each such character. As to the latter, classification apparatus and an accompanying method are also required to provide character rejection decisions that are more reliable than those produced through any rejection scheme heretofore taught in the art. Hence, such a resulting OCR system would likely recognize handwritten characters more accurately and efficiently than has previously occurred with OCR systems known in the art.

DISCLOSURE OF THE INVENTION

I have advantageously invented a pattern classifier which, rather than relying on just the highest and/or next highest output activation values, as occurs with conventional neural classification schemes, bases its rejection on all output activation values. By doing so, my inventive classifier, when used within an OCR system, advantageously overcomes the classification deficiencies inherent in the art.

In accordance with my inventive teachings, a confidence measure, associated with each output of, e.g., a neural classifier, is generated through use of all the neural activation output values. In particular, each individual neural activation output, on, provides information for a corresponding atomic hypothesis, θn, of an evidence function. In this regard, this hypothesis is that a pattern belongs to class n. All these individual hypotheses, one for each of the different classifications produced by the network, collectively form a frame of discernment, $\Theta = \{\theta_1, \ldots, \theta_N\}$, i.e., containing N separate hypotheses where $1 \leq n \leq N$. A partial belief, m, accorded by each of these hypotheses can be expressed as a simple evidence function of the form:

$$m_n(\theta) = \phi_n, m_n(\Theta) = 1 - \phi_n$$

where: $\phi_n$ is a monotonic function of $o_n$.

Each of these functions is then evaluated using the activation output to form a "degree of support" for the underlying belief. A resulting confidence measure for any neural activation output is then determined as a normalized orthogonal sum of the evidence functions for all the activation outputs, i.e., all the possible classifications.

In an illustrative case of a neural network having ten discrete outputs, i.e., one for each of the digits zero through nine, then ten evidence functions exist, with each neural output providing a corresponding hypothesis for an associated evidence function. Such a neural network is used in classifying handwritten numeric digits. Each neural output is transformed through a pre-defined monotonic function into a degree of support in its associated evidence function. These degrees of support are then combined through an orthogonal sum to yield a single confidence measure associated with the classification, i.e., recognized character, then produced as output by the neural network.

The resulting confidence measure generated in this manner is highly reliable and possesses various advantageous properties: the highest confidence corresponds to the highest activation output; and for any one activation output, the confidence increases with growth of that particular activation output, and the confidence decreases with the growth of any other activation output(s). Use of such a confidence measure in conjunction with a classifier, such as a neural network, results in increasingly accurate output classifications, e.g., character recognitions, than have heretofore occurred in the art.

BRIEF DESCRIPTION OF THE DRAWINGS

The teachings of the present invention may be readily understood by considering the following detailed description in conjunction with the accompanying drawings, in which:

FIGS. 3A–3F each diagrammatically depicts the sequence of high-level operations performed by system 5, shown in FIG. 1, on a different illustrative input field of characters;

FIG. 11 tabularly and graphically depicts distributions of positioning error that resulted from simulating the performance of system 5 against that of the "Saccade" system known in the art;

FIG. 12 tabularly and graphically depicts distributions of classification error that resulted from simulating the performance of system 5 against that of the "Saccade" system;

FIG. 13 graphically depicts the "Dempster-Shafer" combination rule;

FIG. 14 graphically depicts orthogonal sums of two simple evidence functions with atomic foci;

FIG. 15 graphically depicts addition of (n+1)th simple evidence function;

FIG. 16 depicts the proper alignment of the drawing sheets for FIGS. 16A and 16B;

FIG. 18 graphically depicts empirically determined percent errors, as a function of percent rejection, that resulted for my inventive evidential rejection process, when used for character classification, as compared to those resulting for four conventional rejection processes;

To facilitate understanding, identical reference numerals have been used, where appropriate, to denote either identical or similar elements that are common to various figures.

MODES OF CARRYING OUT THE INVENTION

After reading the following description, those skilled in the art will readily appreciate that my inventive classifier, while ideally suited for use in a neural network based optical character recognition (OCR) system, can be used in a wide variety of other pattern recognition applications to accurately classify each object within an image to a high degree of confidence. While my invention is preferably suited to function with a neural classifier, it can function quite well with a wide variety of non-neural classifiers. For example, one such illustrative application in so-called "machine vision" might include classifying, i.e., recognizing, whether a given object is located within a scanned two-dimensional field that defines a region through which an end-effector on a robotic manipulator can reach. Typically, my invention would be used in conjunction with apparatus that first precisely locates the center of the object to be classified thereby eliminating extraneous data from the scanned image and thus simplifying classification as well as increasing its overall accuracy. Since my invention is particularly suited for use within a neural network-based OCR system to classify characters, such as, e.g., handwritten numeric characters, that have been precisely located, I will discuss my invention in that context.

Figure 1:
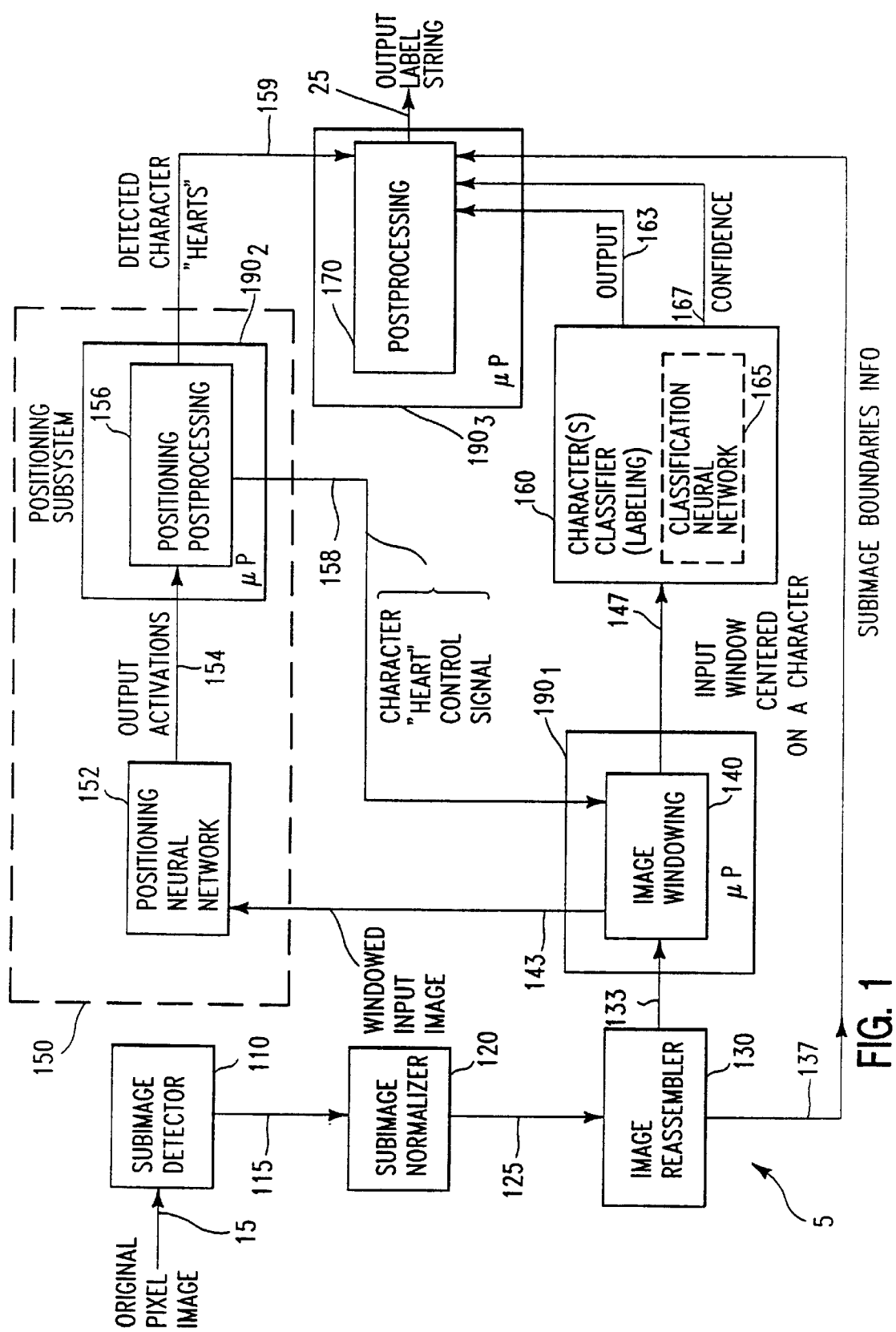
FIG. 1 depicts a block diagram of an embodiment of optical character recognition (OCR) system 5 constructed in accordance with the teachings of the present invention.

FIG. 1 depicts a block diagram of an embodiment of OCR system 5 constructed in accordance with the teachings of the present invention. Broadly speaking, this system parses an incoming image into appropriate scaled sub-images, with each sub-image containing a character(s), locates the center ("heart") of that character(s) within the sub-image through use of a sliding window and a positioning neural network, routes that sub-image to a character classifier, and produces an output label string containing the recognized character(s). Advantageously through my present invention, during classification, a character rejection decision, i.e., a confidence measure for each classified character, is formed from all output activation values from a neural classifier rather than the highest, next highest and/or a combination of the two. As such, character recognition occurs with increased accuracy over that resulting from use of character rejection schemes heretofore taught in the art.

Specifically, system 5 contains sub-image detector 110, sub-image normalizer 120, image reassembler 130, image windowing block 140, character(s) classifier 160, positioning subsystem 150 which itself contains positioning neural network 152 and positioning postprocessor 156, and postprocessor 170. Image windowing block 140, positioning postprocessor 156 and postprocessor 170 are collectively implemented in software executing on either a single or, as shown, separate microcomputers $190_1$, $190_2$ and $190_3$, respectively. Inasmuch as the design, programming and use of microprocessor circuitry are extremely well known in the art, for the sake of brevity, the following discussion will only address those software operations that are pertinent to either locating the "heart" of each character to be subsequently classified or, through the present invention, formulating highly reliable confidence measures for use in rejecting/accepting each resulting classified character.

Figure 3A:
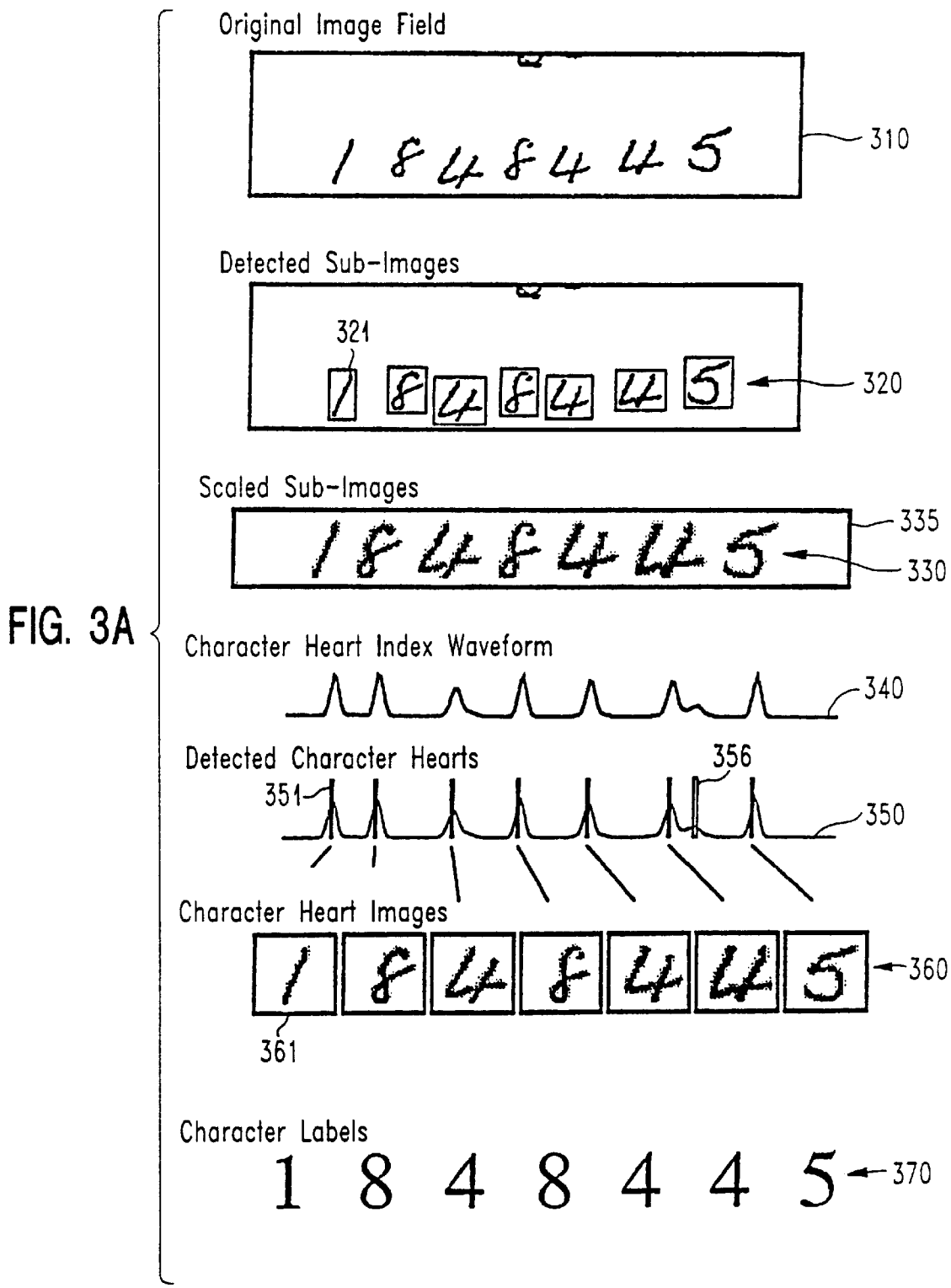
Figure 3B:
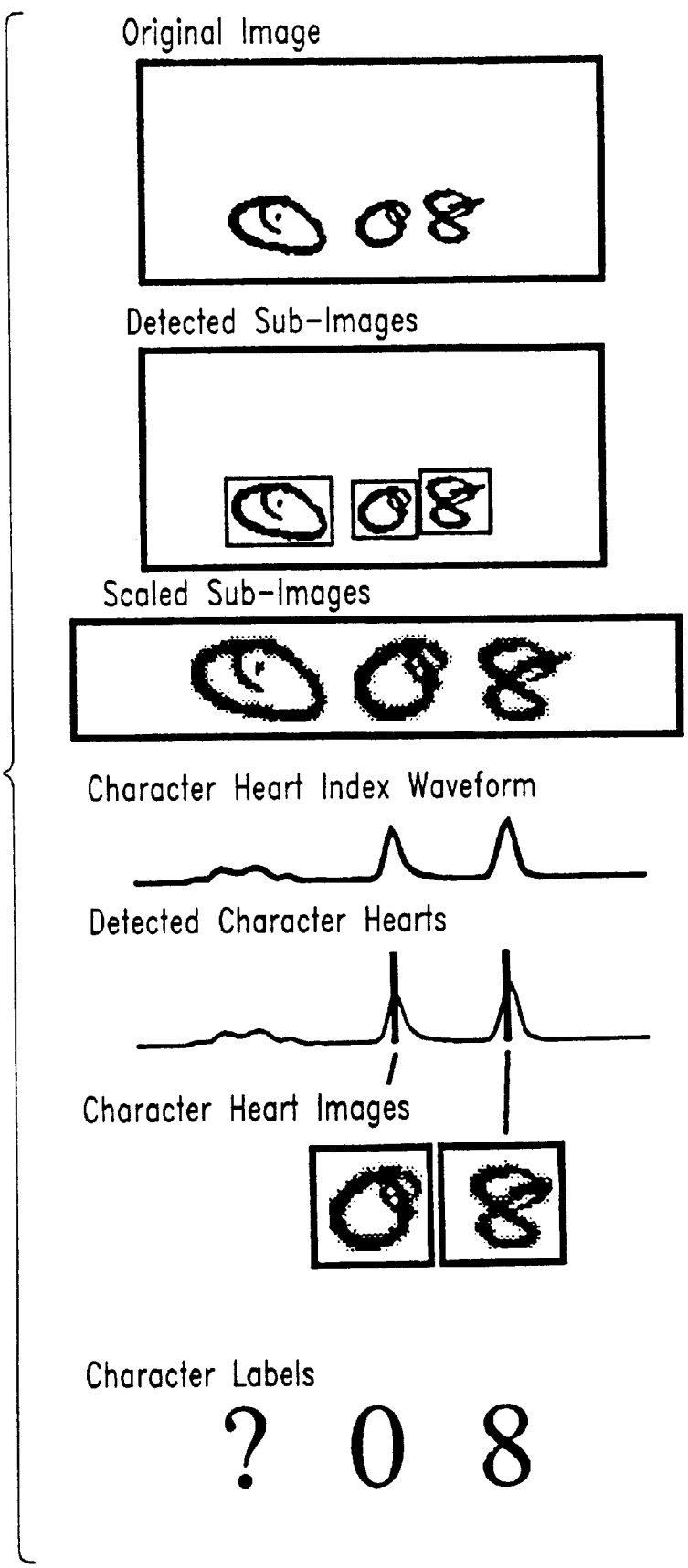
Figure 3C:
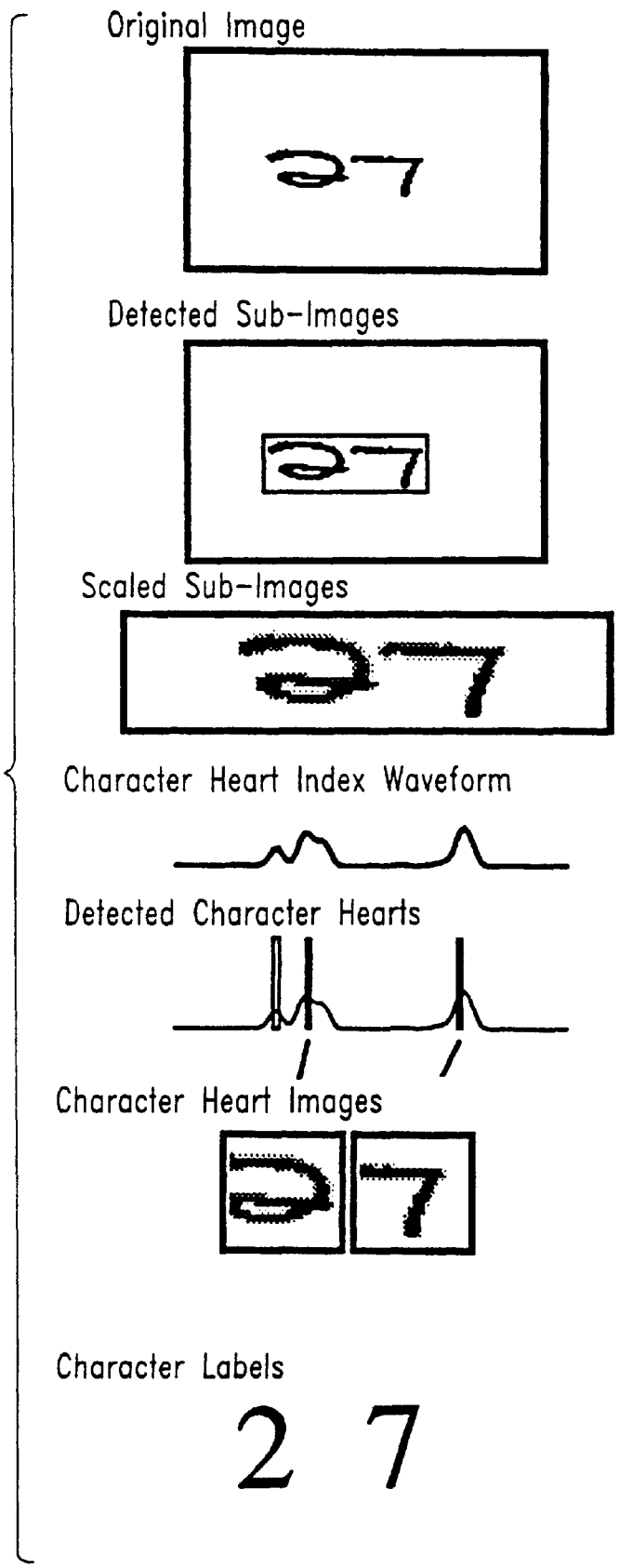
Figure 3D:
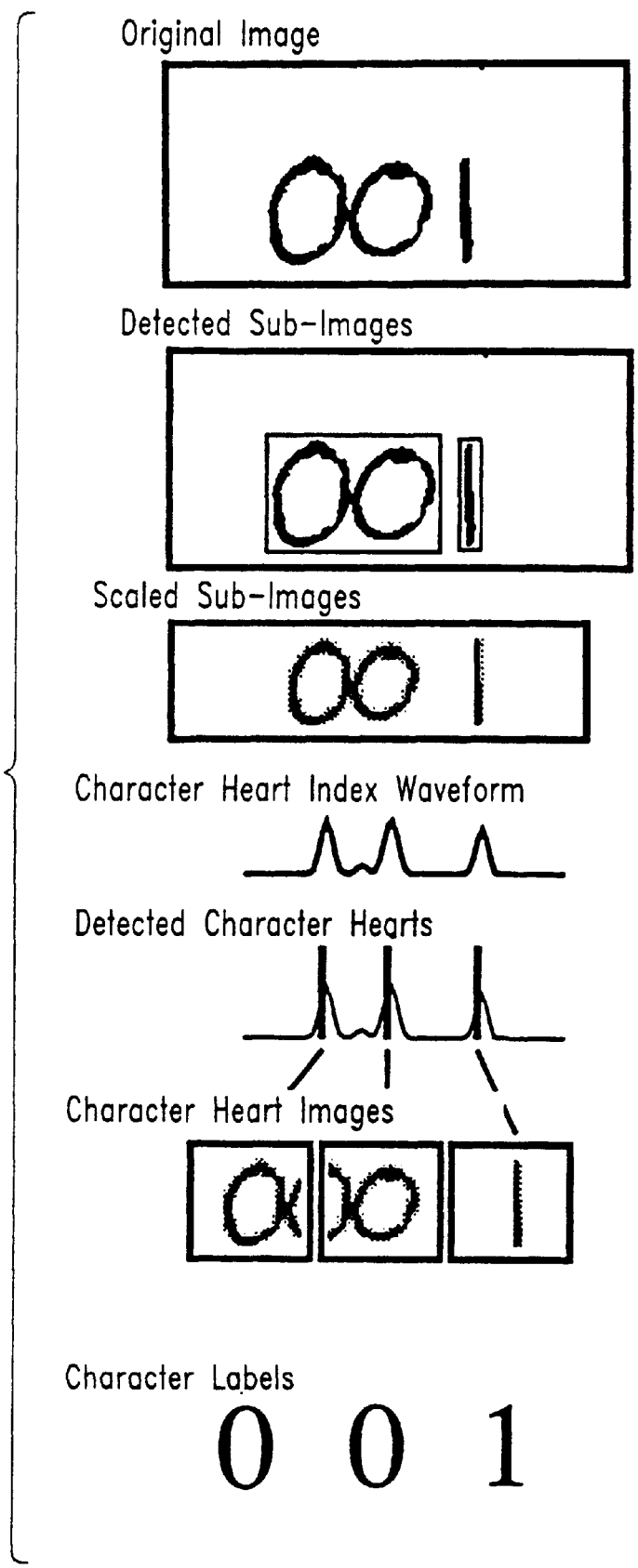
Figure 3E:
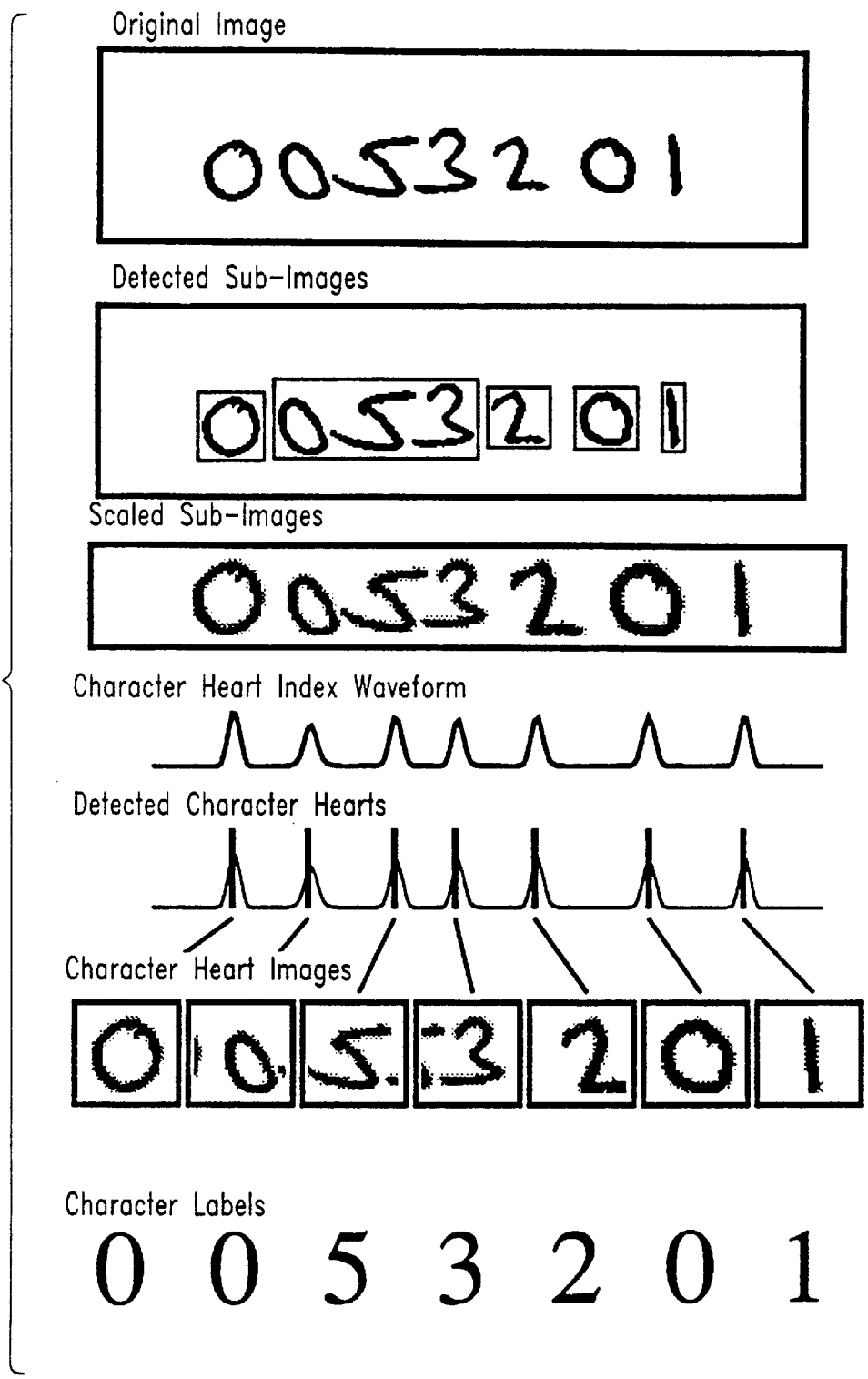

Throughout the following discussion of FIG. 1, the reader should also simultaneously refer, for simplicity, to FIG. 3A, the latter figure diagrammatically depicting the sequence of high-level operations performed by system 5, shown in FIG. 1, on illustrative input field 310 of handwritten characters. FIG. 3A illustrates a simple case where each scaled sub-image, as defined below, contains exactly one character.

To facilitate understanding, the discussion will proceed in various stages. First, I will describe OCR system 5, in detail, both in terms of apparatus and an accompanying method, and as it relates to accurately locating each character "heart". So to avoid causing any confusion, this description will merely afford an overview of character classification so that the reader appreciates its use, as a component, within this OCR system. Then, I will proceed to describe the presently inventive portion of this system and that which specifically determines a highly reliable confidence measure for each classified character. My present invention involves an application of a branch of statistical processing, specifically the Dempster-Shafer Theory of Evidence and particularly, as here, for formulating confidence measures for classified characters. Accordingly, I will succinctly introduce this theory, to the extent relevant, prior to describing my application of this theory for generating confidence measures and the actual implementation of my present invention within system 5. Finally, I will provide empirically determined performance results for system 5 that uses my present invention vis-à-vis use therein of conventional confidence measurement schemes.

A. System 5 and its determination of Character "Heart" Locations

In operation, an incoming, typically scanned, digitized pixel image, that contains handwritten characters to be recognized, is divided (by circuitry not shown) into horizontal rows, typically 190 pixels high (though this height is not critical), hereinafter called "fields". Each field, such as field 310—which is not drawn to scale, is expected to contain one and usually more handwritten characters though, given the variability of human handwriting from one person to the next, the size and center location of each such character within the field often varies widely among the characters. Field 310 illustratively contains seven characters. To simplify the ensuing center detection and character recognition tasks, the incoming pixels in each field are first preprocessed. In doing so within system 5, these pixels are first applied, over leads 15, to sub-image detector 110. This detector locates blank columns that are sufficiently wide, typically 4–6 pixels, to serve as sub-image boundaries between adjacent characters in the field. Each resulting sub-image in FIG. 3A, such as boxed sub-images 320 of which sub-image 321 is illustrative, will here, for simplicity of explanation, contain a separate character. To sharply reduce the number of separate training patterns that need to be applied to the two neural networks, as discussed below that are separately used in character "heart" detection and character recognition, and thus significantly simplify these networks, all sub-images, appearing on leads 115, are then normalized to a common size, typically 20 pixels in height, by sub-image normalizer 120. The resulting normalized sub-images, such as those shown as sub-images 330, are applied, via leads 125, to image reassembler 130. This block reassembles the normalized sub-images, in the exact sequence detected, back into a single field, such as field 335, having a height of 20 pixels. To simplify the following discussion, from hereon, a "field" will be that produced by image reassembler 130, unless specifically noted to the contrary. Image reassembler 130 provides sub-image boundary address information, via leads 137, to postprocessing block 170. Though, as will become evident based on the discussion below, this step is not necessary, providing this address information expedites postprocessing. Blank 12-pixel wide columns are prepended and appended to each field in order not to miss first and last characters therein. Through use of image reassembler 130, sub-images are assembled, as sub-fields, with as little as a four to six pixel gap between adjacent sub-fields, into a common field, thereby eliminating any further need to manipulate and process much larger sub-images. Two blank lines are added both along the top and bottom of the recombined field as preferred by the so-called "Gabor projection" technique; this technique is described in A. Shustorovich, "A Subspace Projection Approach to Feature Extraction: The Two-Dimensional Gabor Transform for Character Recognition", *Neural Networks*, 1994, Vol. 7, No. 8. Sub-image detector 110, sub-image normalizer 120 and image reassembler 130 are all conventional and well known in the art and, for optimum performance, are each implemented through high-speed dedicated programmable digital hardware rather than a programmed general purpose microcomputer. Sub-field boundary information is also provided, via leads 133, to image windowing block 140. Though not specifically shown and not relevant to the present invention, the binary pixels in the sub-images are also preprocessed to exhibit a simulated gray scale.

Using the sub-field address information, image windowing block 140 crops (parses) a sequence of 24-pixel high by 36-pixel wide portions (hereinafter referred to as a "window"), each with a specific horizontal offset (step size) with respect to the next such portion, from a field and passes that windowed image portion, via leads 143, to positioning subsystem 150 and specifically positioning neural network 152 therein. Consequently, a sequence of positionally staggered, overlapping 36-pixel wide windows that collectively traverses across the entire field, i.e., a so-called "sliding window", results. Each of these windows, as will be shortly become evident, is essentially and separately convolved with the field portion. Network 152, specifically depicted in FIG. 2 and discussed in detail below, provides twelve separate neural output activations, via leads 154 shown in FIG. 1, which collectively signal whether a character in the field is centered, i.e., has its "heart", coincident with any 1-pixel wide column within a 24-pixel high by 12-pixel wide array located within the center of each 24-pixel high by 36-pixel wide window, as that window is then positioned relative to the field. Each of the neural activations corresponds to one of twelve horizontal pixel positions along this array. The precision at which a human operator can mark a character "heart" is relatively low, typically within a resolution of one or two pixels at best. As such, positioning neural network 152 is trained to produce target high level, i.e., one, output activations at three consecutive output nodes (output neurons) if the character "heart" exists at a pixel position corresponding to that associated with the middle of these three nodes. The rest of the neural output activations are set to low, i.e., zero. In this manner, the output waveform for any one of the 12 output neurons exhibits "bumps" of activation that indicate each character "heart" as the sliding window effectively passes over it. In order to permit all or most of the characters centered at each of the 12 output node pixel positions to fit inside the window, two twelve-pixel wide column buffer positions, on both the far left and right sides of the window, though without corresponding output nodes are provided within positioning neural network 152.

The output activations provided by positioning neural network 152 are routed, via leads 154, to positioning post-processing block 156. This block accumulates the output activations for the same pixel position in the field, but corresponding to different window positions, and then averages, typically on a weighted basis as described in detail below, these output activations. This averaging imparts a required level of robustness into the detected character "heart" position. By virtue of averaging, a speed-robustness tradeoff exists inasmuch as a small sliding step size, such as one or two pixels, can be chosen to produce increased positional and character recognition accuracies but at a cost of additional processing time and hence reduced character recognition throughput. We have found that a step size of four or six pixels, as illustratively used below, provides excellent performance in terms of throughput and recognition accuracy.

In addition to output activation accumulation and averaging, position postprocessing block 156 also filters the averages and generates a character-heart index, $\chi$. Then, block 156 thresholds a thus-obtained $\chi$-wave (a waveform of the index values) and thereafter, based on another weighted average of individual $\chi$-values weighted by corresponding horizontal pixel positions, determines the horizontal pixel position of the character "heart". A waveform of a character-heart index, i.e., a χ-wave, with "bumps" (local peaks) corresponding to the sequence of characters in field 335 is shown in FIG. 3A as waveform 340. The particular operations undertaken by positioning postprocessing block 156 are graphically depicted in FIGS. 5–9 and in flowchart form, for an actual software implementation of this block as Positioning Postprocessing Routine 1000, in FIG. 10, and are discussed in detail below.

Positioning postprocessing block 156, shown in FIG. 1, provides a control signal, i.e., the CHARACTER "HEART" CONTROL SIGNAL, on lead 158, to image windowing block 140 to indicate when a character center position ("heart") has been found and the value of the corresponding horizontal pixel position of this "heart".

Once the "hearts" for all the characters in the field have been found, as indicated for field 335 by solid vertical black bars, e.g., bar 351, in illustrative waveform 350 in FIG. 3A, and appropriate notification has been provided thereof over leads 158 to image windowing block 140 shown in FIG. 1, block 140 successively parses the field to pass a 24-pixel by 24-pixel portion thereof, of which portion 361 is typical, centered about each character in sequence, via leads 147, to character(s) classifier 160. This classifier, also illustratively separate neural network 165 (illustratively shown in FIG. 2 and discussed in detail below), recognizes the character within each 24-pixel by 24-pixel field portion, all of these portions for field 335 shown in FIG. 3A being collectively identified as portions 360. Network 165 has been trained to recognize single characters. The output of this particular network is a series of output activations on leads 167 with each such output corresponding to a separate character for which this particular network has been trained. All these output activations are routed, via leads 167, to evidential confidence estimator 175 which, in accordance with my present inventive teachings, produces a confidence measure based on all these output activations for the character then classified by network 165. Furthermore, character classifier 160 also provides to postprocessor 170, via lead 163, a label of the character, i.e., here a numeral between zero and nine, which is associated with the highest output activation and is thus taken as a "Best Guess" output classification by this network. Though classifier 160 is discussed herein and is preferably implemented as a separate neural network, i.e., through network 165, this classifier is not so limited and can be implemented through any preferably trainable generic pattern recognition circuit or process.

To validate the character recognized by classifier 160, positioning postprocessing block 156 also routes the horizontal pixel position, in the field, of each detected character "heart" (DETECTED CHARACTER "HEARTS"), via leads 159, to postprocessing block 170. In addition, positioning postprocessing block 156 also provides the combined character-heart index value, χ, for that character "heart" to block 170.

Postprocessing block 170 implements a relatively simple rule-based two-level reject process in generating an output character string given the outputs provided by character(s) classifier block 160 and positioning sub-system 150. The first level is associated with characteristics of the character-heart index waveform, i.e., the χ-wave itself, while the second level, particularly aimed at rejecting dubious characters, is associated with a confidence value generated by evidential confidence estimator 175 for the character that has just been classified and with its label appearing on leads 163. These levels can function on an inter-related basis, as described below.

On the first level, if the combined character-heart index identifies an activation group that is sufficiently high and wide to indicate a character "heart", but the highest individual character-heart index, i.e., χ-value, in the group is lower than a pre-defined threshold, postprocessing block 170 generates a reject signal (not specifically shown). In this case, a human operator can determine what exactly caused the reject. Alternatively, if positioning subsystem 150 cannot find a character "heart" within the boundaries of a corresponding sub-image, the postprocessing block also generates a reject signal. This latter situation may occur in response to a "clump" of scanner noise, or to an extremely wide or unusual character for which the positioning network has not been trained. Additionally, postprocessing block 170 determines and monitors the width of each sub-field based upon boundary address information provided over leads 137 from image reassembler 130. If the number of separate character "hearts" detected by positioning sub-system 150 is inconsistent with the sub-field width, i.e., is greater than that which would be expected for a given width, then postprocessing block 170 also generates a reject signal. If two adjacent character "hearts" are too close to each other, postprocessing block 170 will organize "competition" between two detected character "hearts" and decide the valid character(s) based on pre-defined rules. For example, if the distance from one competing character "heart" to the next is less than, e.g., ten pixels, and the labels (symbols) of the recognized characters are relatively wide and different, such as either the numeral "2" or "5", postprocessing block 170 may ignore, for certain recognized characters, that one of the two characters having the lower combined character-heart index value, i.e., χ-value, such as for that shown by open vertical bar 356 in FIG. 3A, but permit both characters to exist if they are both recognized as being the numeral "1".

On the second level, if the confidence measure produced by evidential confidence estimator 175 is numerically too low, i.e., less than a pre-defined threshold confidence value, the corresponding character is also rejected. If a reject signal is generated during the processing of a field, this field is saved to a separate file (not specifically shown) by postprocessing block 170 for future viewing by a human operator. Within this file, postprocessing block 170 represents positioning subsystem rejects by question marks displayed in corresponding pixel positions of the field, while each rejected character is represented, in red, by its "best-guess" character symbol. Postprocessing block 170 routes the resulting character string, such as illustrative string 370 shown in FIG. 3A, to output leads 25 for subsequent downstream processing.

Now, to appreciate the operation of system 5 in determining the position of character "hearts" in more realistic situations than that depicted in FIG. 3A, the reader should now consider FIGS. 3B–3F.

Each of these latter figures depicts the results of the operations, as described above, for sub-images that contain, e.g., more than one character and, in some instances, touching characters. Inasmuch as the same operations, discussed above though with different sub-image data, generate the results shown in these figures, for the sake of brevity, we will not discuss FIGS. 3B–3F in any detail.

Figure 2A:
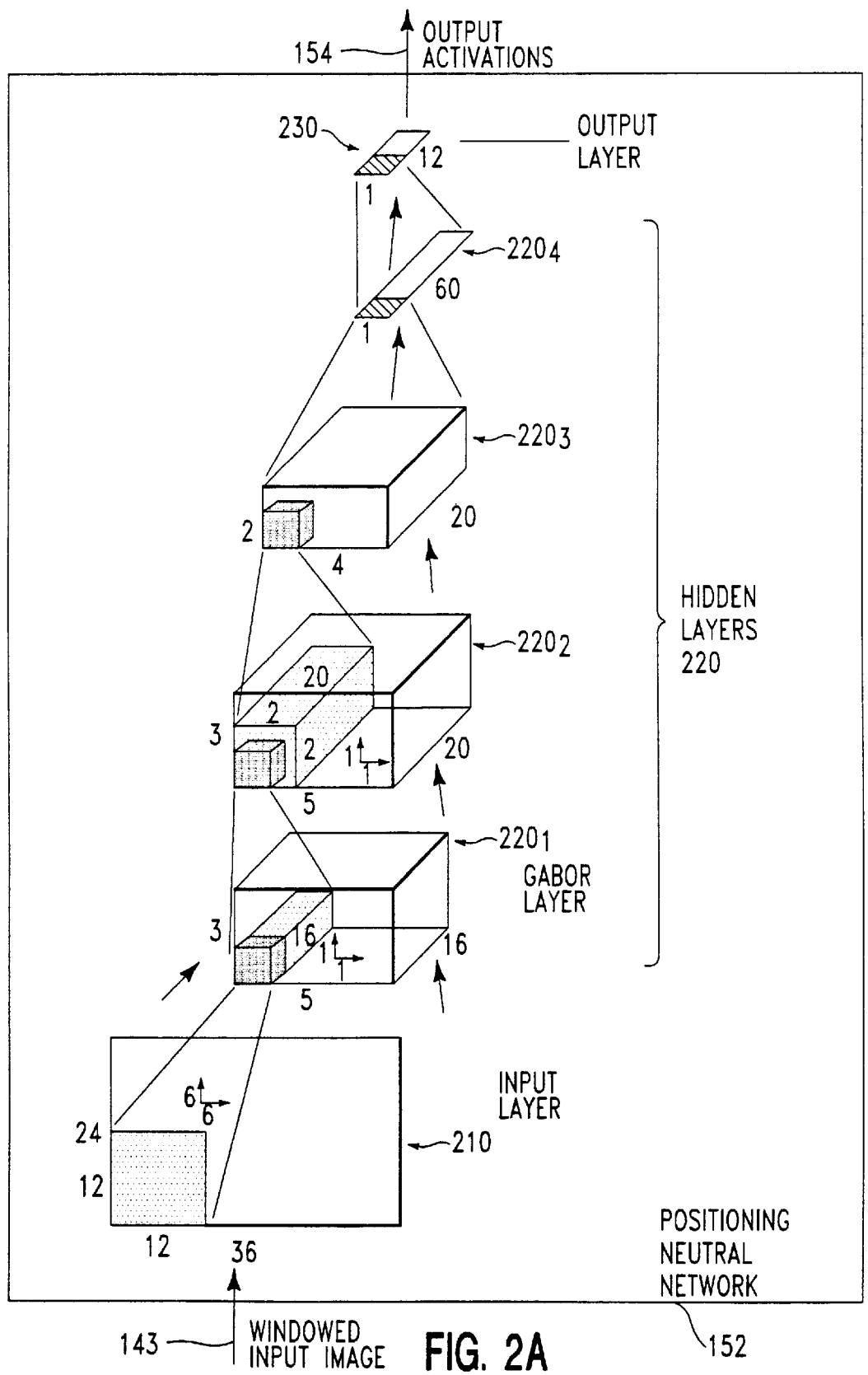
FIGS. 2A and 2B collectively depict the topological structure of neural networks used within positioning subsystem 150, and specifically positioning neural network 152 therein, and character(s) classification block 160, specifically classification neural network 165 therein, all of which is shown in FIG. 1.

FIG. 2A depicts an illustrative topological structure of positioning neural network 152 and classification neural network 165, both of which are shown in FIG. 1.

As shown in FIG. 2A, positioning neural network 152 is formed of six distinct layers: 24-pixel high by 36-pixel wide input layer 210, hidden layers 220 and 12-neuron output layer 230. As the sliding window traverses in stepped fashion (with the step size being 12/m where m is an integer) across the field, at each resulting location of the window, each pixel in the "windowed" portion of the field, i.e., underlying the window, is applied to a two-dimensionally located corresponding input neuron in input layer 210. The outputs of the input neurons in layer 210 are applied, as input, to hidden layers 220, formed in succession of: Gabor layer 220$_1$, and trainable hidden layers 220$_2$, 220$_3$ and 220$_4$. Gabor layer 220$_1$, implements Gabor projections and uses 12×12 local receptive fields (LRFs) with fixed weights and bias values. The step between adjacent LRFs, in layer 210, is six pixels in both directions. Sixteen Gabor basis functions are preferably used with circular Gaussian envelopes centered within each LRF; we use both sine and cosine wavelets in four orientations and two sizes. For a detailed description of these basis functions, see, e.g., J. Daugman, "Complete Discrete 2-D Gabor Transforms by Neural Networks for Image Analysis and Compression", *IEEE Transactions of Acoustics, Speech and Signal Processing*, Vol. 36, No. 7, 1988, pages 1169–1179. All sixteen projections from each LRF constitute the input to a column of 20 hidden neurons in hidden layer 220$_2$; thus, this layer is organized as a three-dimensional array of 3×5×20 neurons. The output of layer 220$_2$, in turn, is fed as input to hidden layer 220$_3$. This latter layer also uses LRFs, though in layer 220$_2$, organized as a three-dimensional array of 2×2×20 neurons with a step of 1×1×0. Units in hidden layer 220$_3$ are duplicated twenty times thus forming a three-dimensional array of 2×4×20 neurons. The fourth hidden layer, i.e., layer 220$_4$, contains a single column of 60 neurons fully connected to previous layer 220$_3$. The neural outputs of layer 220$_4$ are fully connected as input to neurons in 12-neuron output layer 230. The resulting 12 neural output activations of layer 230 are applied, via leads 154, as output of positioning neural network 152.

Figure 2B:
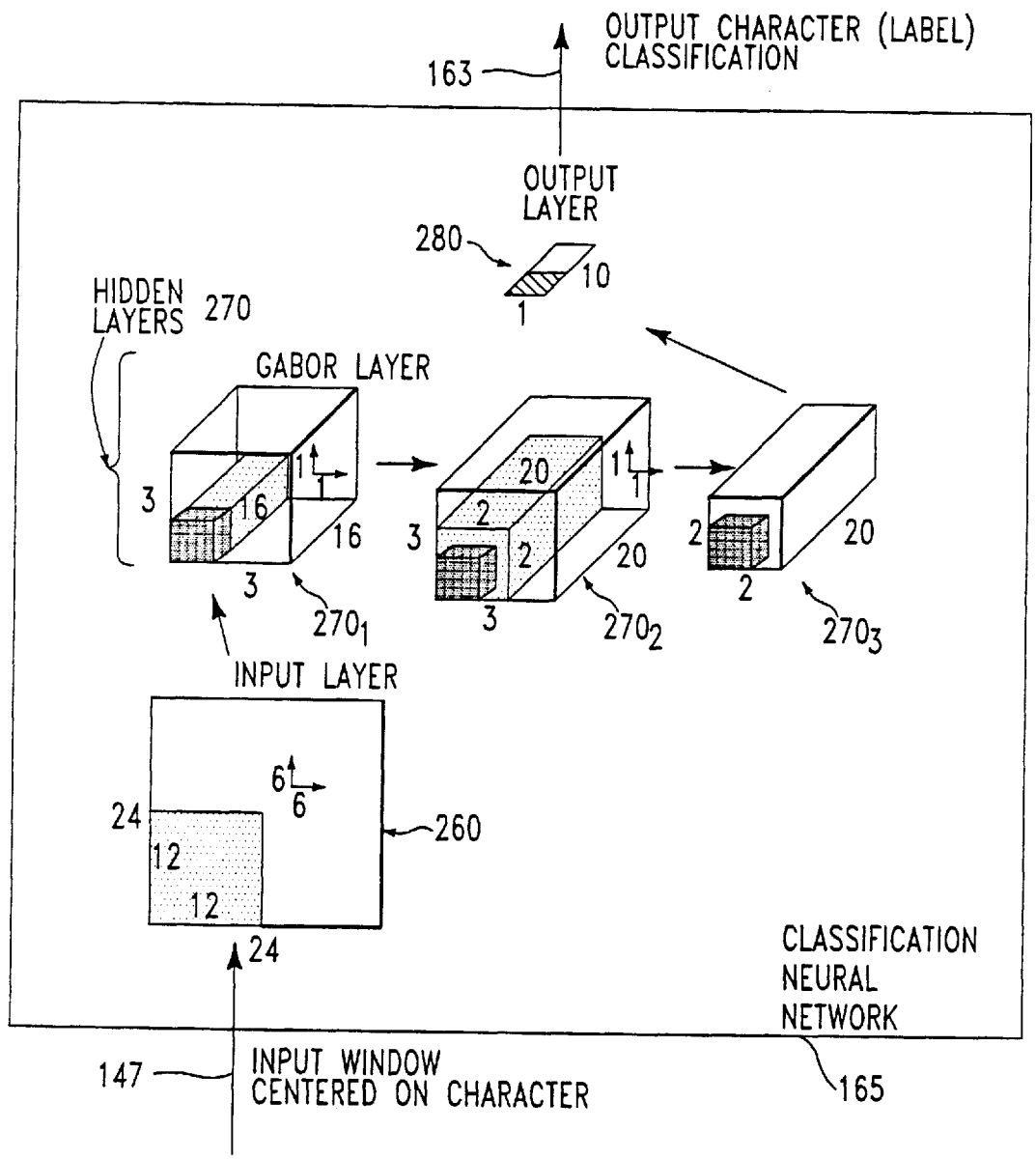

The structure of classification neural network 165 is highly similar to that of positioning neural network 152. In particular, network 165 is formed of five distinct layers: 24-pixel high by 24-pixel wide input layer 260, hidden layers 270 and output layer 280. Each pixel in the 24-pixel by 24-pixel (windowed) field portion produced by image windowing block 140 (see FIG. 1) and appearing on leads 147 is applied, as shown in FIG. 2B, to a spatially corresponding input neuron in input layer 260. The outputs of the input neurons in layer 260 are applied, as input, to hidden layers 270, formed in succession of: Gabor layer 270$_1$, and trainable hidden layers 270$_2$ and 270$_3$. Gabor layer 270$_1$ implements the Gabor projections, identically as does Gabor layer 220$_1$, and uses 12×12 local receptive fields (LRFS) with fixed weights and bias values. The step between adjacent LRFs, in layer 260, is six pixels in both directions. Similar to layer 220$_1$, all sixteen projections from each LRF constitute the input to a column of 20 hidden neurons in hidden layer 270$_2$; thus, layer 270$_2$ is organized as a three-dimensional array of 3×3×20 neurons. Also, layer 270$_2$ uses shared weights. The output of layer 270$_2$, in turn, is fed as input to hidden layer 270$_3$. This latter layer also uses LRFs, in layer 270$_2$, organized as a three-dimensional array of 2×2×20 neurons with a step of 1×1×0. Units in hidden layer 220$_3$ are suitably duplicated thus forming a three-dimensional array of 2×2×20 neurons, for a total of 80 neurons in this layer. The neural outputs of layer 220$_3$ are fully connected as input to neurons in 10-neuron output layer 280. Inasmuch as neural network 165 is tailored to recognizing numerical digits, i.e., "0" through "9", output layer 280 has ten neurons, each of which is associated with a different one of the ten digits. The resulting ten neural output activations of layer 280 are applied, via leads 167, as output of classification neural network 165. With a suitable number of output neurons and an appropriate network topology, network 165 could alternatively be trained to recognize a different character set than just numerical digits, as occurs here.

Network 152 is trained to recognize the horizontal pixel location of a character center ("heart"), for each character within an entire pre-defined set of training characters, as the 24-pixel high by 12-pixel wide array at the center of the sliding window moves across that character. Network 165 is trained to recognize each individual training character, here illustratively numeric digits "0" through "9", centered within a 24-pixel by 24-pixel sub-field. Illustratively, both of these networks are trained through conventional back propagation using pre-defined training sequences in order to properly adjust internal weights and bias values within the hidden layers therein. Inasmuch as the particular manner through which each of the networks is trained is not pertinent to our invention, this aspect will not be discussed in any further detail. Since back propagation is conventional and widely known in the art, for additional details on back propagation, the reader is simply referred to, e.g., D. E. Rumelhart et al, *Parallel Distributed Processing*, Vol. 1, pages 328–330 (© 1988, MIT Press) and J. A. Freeman et al, *Neural Networks—Algorithms, Applications and Programming Techniaues*, pages 89–125 (©1991: Addison-Wesley Publishing Company, Inc.).

Figure 4:
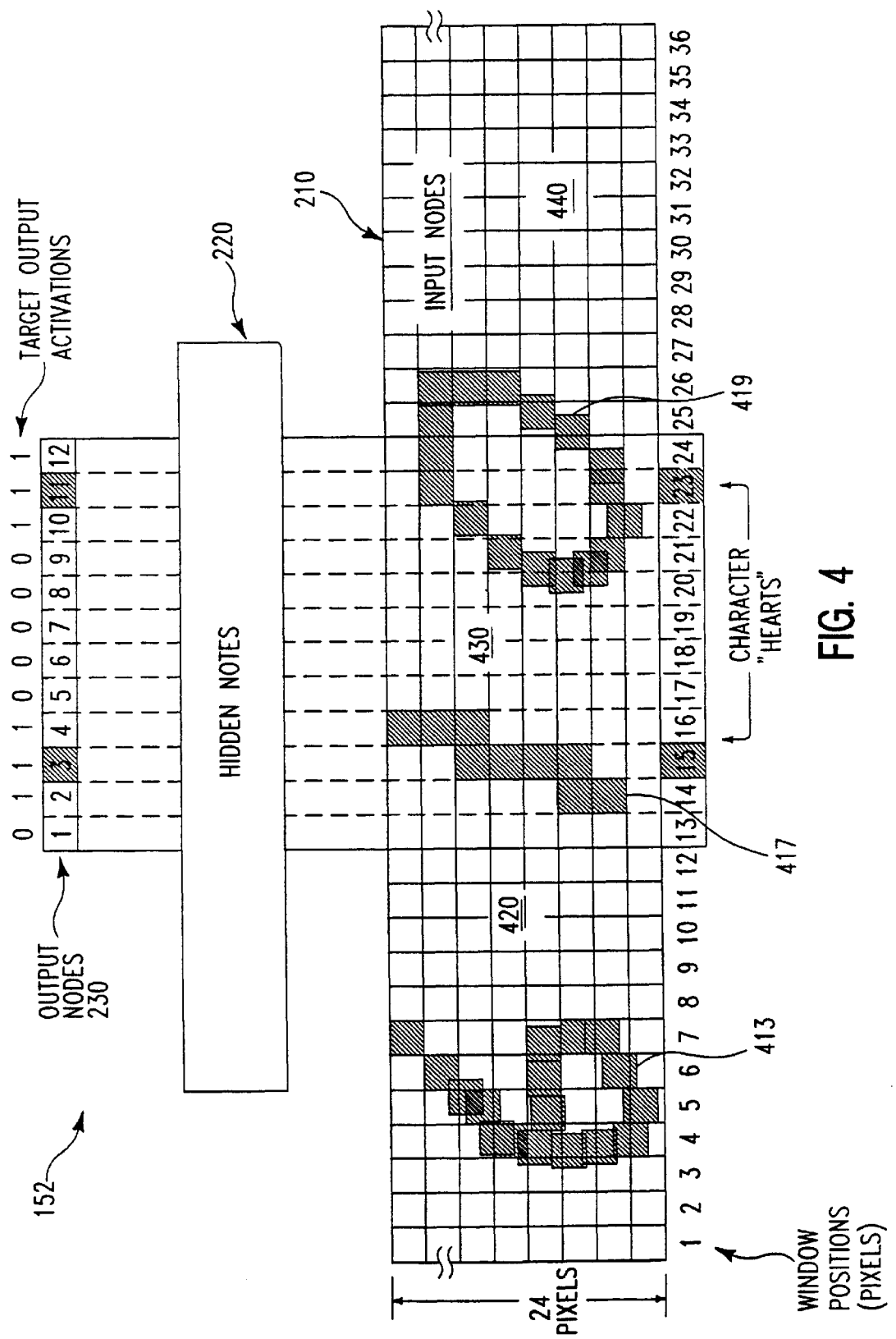
FIG. 4 diagrammatically depicts three illustrative scaled characters in an input field applied, via a sliding window formed of a 24×36 pixel array, to positioning neural network 152, shown in FIG. 1, and the positional correspondence of the output nodes of this network relative to a current position of the window with respect to the input field.

FIG. 4 diagrammatically depicts three illustrative scaled characters, specifically numerals "6", "1" and "0", in an input field applied, via a sliding window formed of a 24×36 pixel array, to positioning neural network 152 and the positional correspondence of the output nodes of this network relative to a current position of the window with respect to the input field. As discussed, input nodes 210 of network 152, receive data from the array of 36×24 pixels over which the window is positioned. This array can be viewed as containing central 12×24 pixel array portion 430 situated between 12×24 pixel array portions 420 and 440. Neural positioning network 152, though receiving pixel data from the full array of 36×24 pixels, determines whenever central portion 430 of the sliding window is situated over a center, i.e., "heart" of a character(s), such as the numerals "1" and "0" shown here as having centers then positioned over horizontal pixel positions 15 and 23 within the sliding window. When that occurs, the output node(s), here illustratively output nodes 3 and 11 designated by shading, corresponding to the particular horizontal pixel positions within central window portion 430, produces a high valued output activation to indicate that at that window position in time the character "hearts" existed at those pixel positions. In addition, immediately adjacent output nodes, here illustratively nodes 2, 4, 10 and 12, are also trained to each produce a high-valued output activation. All the other output nodes produce a low level, i.e., zero, output activation; and so forth for character "hearts" coincident with other pixel positions in central portion 430. As the window is slid to the right over these characters, the characters will in effect move to the left relative to the window. Hence, the high level output activations corresponding to each character "heart" will also shift, by the positional amount through which the window steps to the right, to increasingly leftward output nodes, as shown in FIG. 5 and discussed below, until that character "heart" is no longer coincident with any pixel position within central portion 430.

Figure 5:
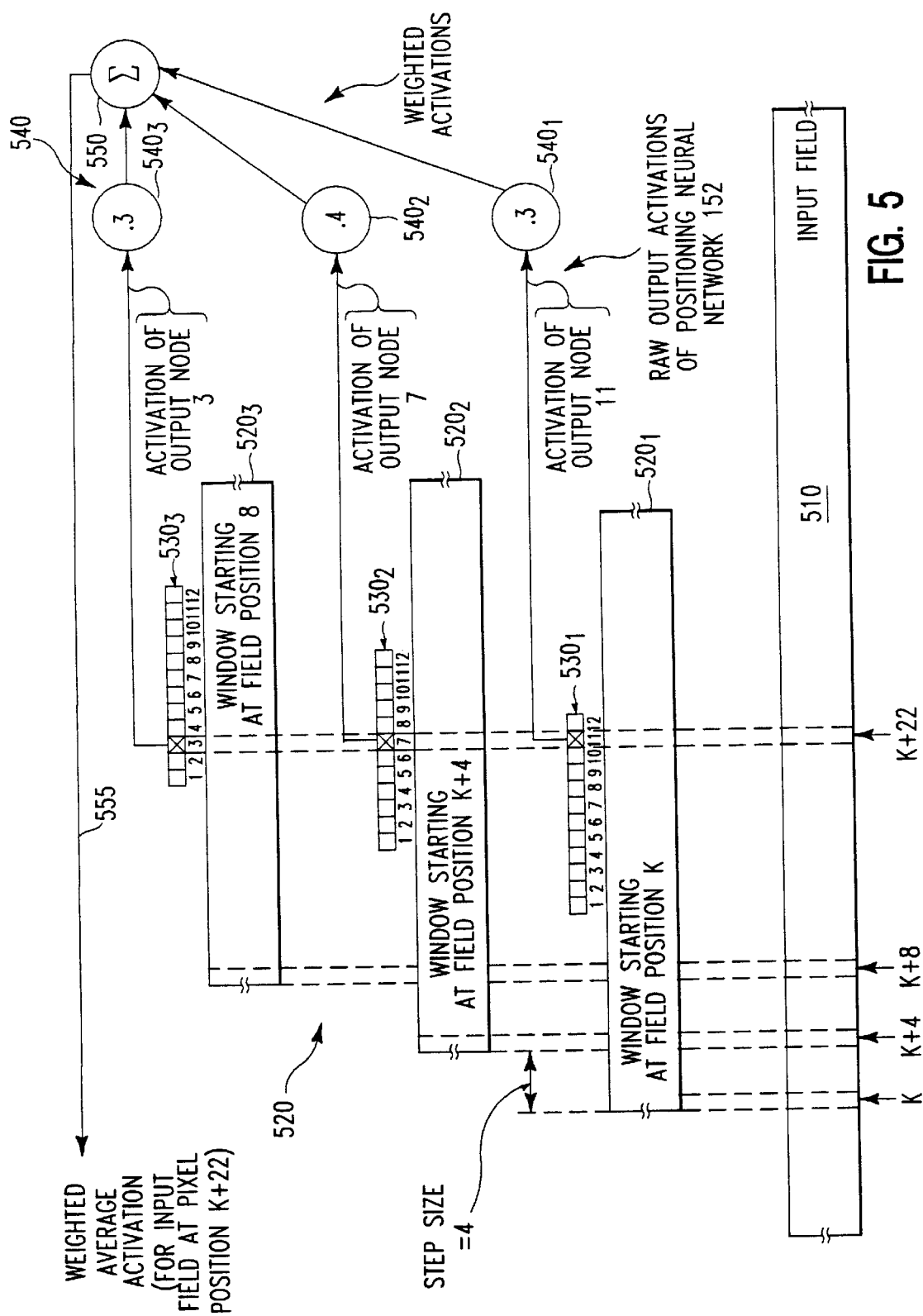
FIG. 5 diagrammatically depicts the neural output activations of a sliding window, such as that shown in FIG. 4, for an illustrative step size of four pixels, as that window traverses across the input field, and the averaging of these outputs, all illustratively occurring within inventive system 5, specifically positioning postprocessing block 156, shown in FIG. 1.

To fully appreciate the relationship between positional shifts in the sliding window with respect to a character "heart" coincident with the window, consider FIG. 5. This figure diagrammatically depicts the neural output activations of sliding window 520 for an illustrative step size of four pixels, as that window traverses, in a step-wise fashion, across the input field, as well as the averaging of these output activations.

As shown, as window 520 is stepped, at four pixel increments, across field 510, from starting (leftmost) position K to position K+4 to finally position K+8. Assume, for purposes of illustration, that a character (not specifically shown) is centered about, e.g., illustrative pixel position K+22 within the field. Consequently, as the window steps across the character to effectively form at correspondingly different times windows $520_1$, $520_2$ and $520_3$, the "heart" of this character, through the entire positioning neural network, will produce, an output activation at each of three output nodes, specifically nodes 11, 7 and finally 3, spaced at four pixel increments. This results by virtue of the character "heart", situated at pixel position K+22 in the field, being spatially coincident, at successive times, with corresponding horizontal (field) pixel positions 11, 7 and 3 within the central portion of the sliding window and associated with output nodes 11, 7 and 3, respectively, of the positioning neural network. The horizontal (field) pixel positions of central portion of the sliding window is represented by window portions $530_1$, $530_2$ and $530_3$. The three different output activations for the common pixel position, K+22, in the input field, are combined through a weighted average. The output activations for output neurons 11, 7 and 3 are multiplied, through multipliers $540_1$, $540_2$ and $540_3$, respectively, by appropriate empirically defined weights. Though, as shown, the weights are chosen to be 0.3, 0.4 and 0.3 (for a total of "1"), to slightly favor pixel positions within central pixel positions within these window portions, we have found that the weights are not critical. A simple non-weighted average can be easily used instead. The resulting weighted output activations are then accumulated in summer 550 and routed, via lead 555, as a weighted average activation for pixel position K+22 in the field. If the step size were decreased, such as to two pixels, then each horizontal pixel position in the input field would be coincident, with an increased number of pixel positions, here six, within the central portion of the sliding window as the window slides across the field. Hence, a correspondingly larger number of separate output activations, here six, would be averaged together, for any one horizontal pixel position in the input field. As noted above, use of a smaller step size does produce an increasingly accurate average and hence increased positioning accuracy, though at a cost of increased processing time needed to form each of these averages.

Figure 6:
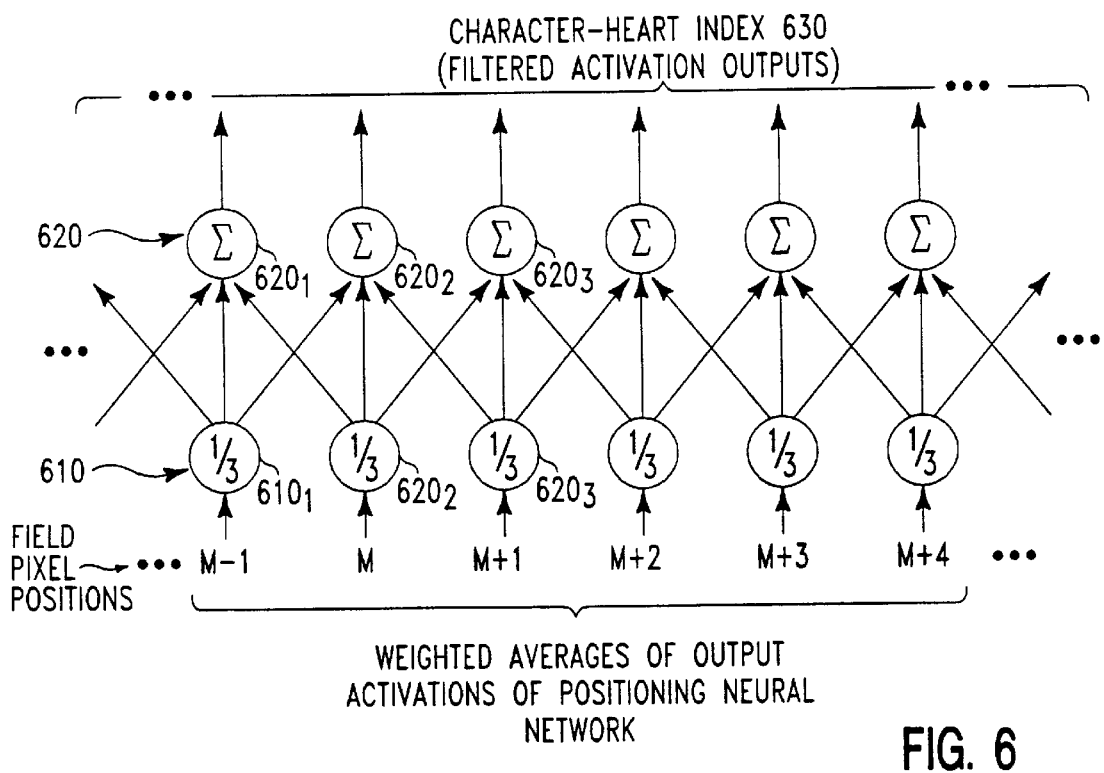
FIG. 6 diagrammatically depicts a process, occurring within inventive system 5, particularly positioning postprocessing block 156 shown in FIG. 1, to filter averaged output activations and produce a character-heart index, χ.

Once the average for each horizontal pixel position in the field is determined, the averages are then digitally filtered, to remove irregularities and, by doing so, provide enhanced robustness, as shown in FIG. 6. As shown, this filtering merely involves averaging three adjacent averaged activations in order to produce a character-heart index value. This is accomplished by multiplying each averaged activation value, such as illustratively averaged activation values for horizontal (field) pixel positions M−1, M and M+1, by one third, such as through multipliers 610, illustratively multipliers $610_1$, $610_2$ and $610_3$. The output of each multiplier is routed to three adjacent summers within summers 620, illustratively summers $620_1$, $620_2$ and $620_3$, which sums its three inputs to provide a filtered output, all of these filtered outputs being filtered activations 630, previously called the character-heart index.

Figure 7:
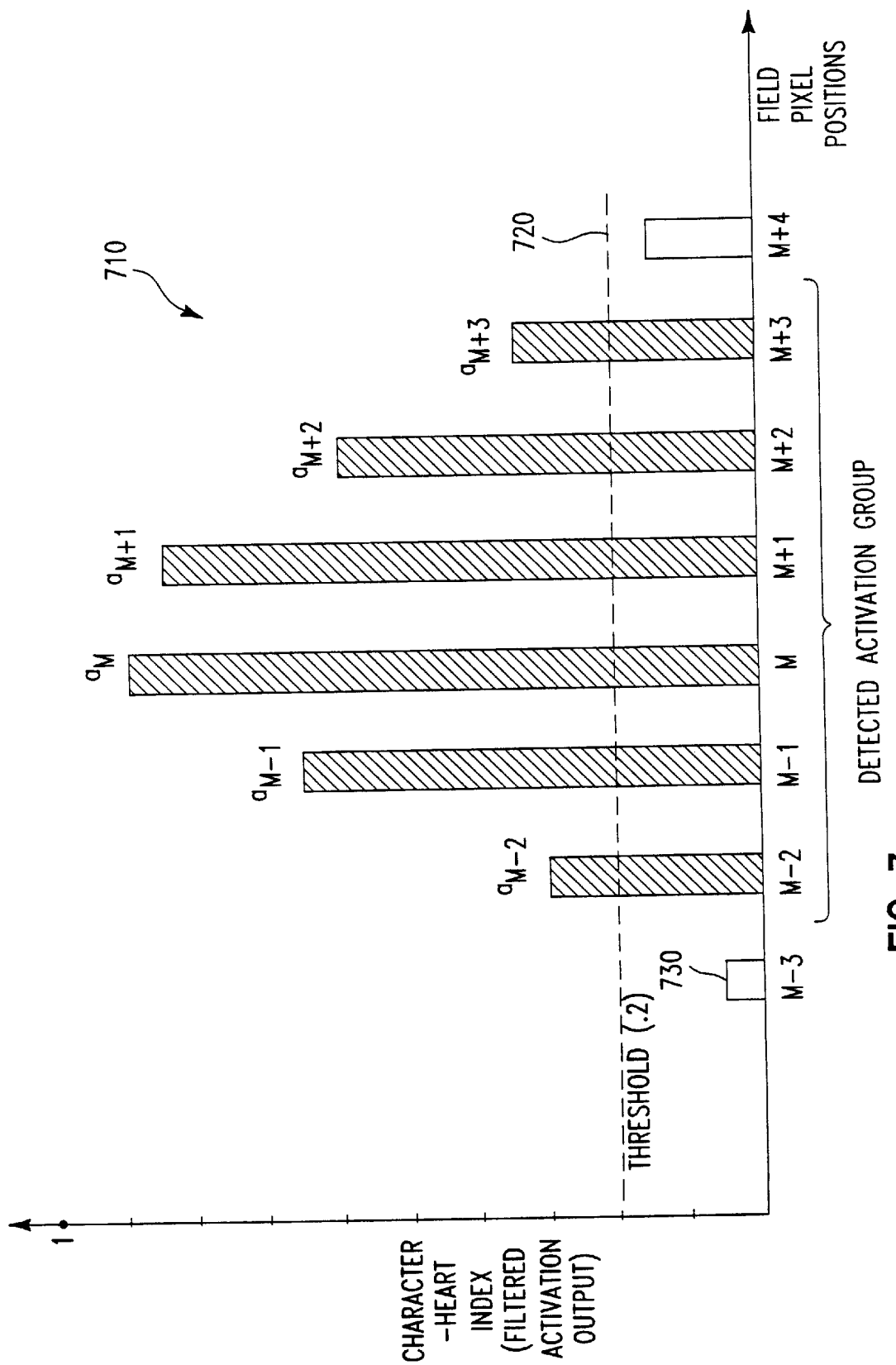
FIG. 7 diagrammatically depicts a thresholding process, also occurring within positioning postprocessing block 156, for thresholding the character-heart index values shown in FIG. 6 in order to generate a thresholded activation group.

After the character-heart index, χ, values are determined, these values are thresholded as shown in FIG. 7. FIG. 7 depicts a typical activation group, i.e., the group of χ-values, associated with a character "heart". As shown, the group assumes a typical Gaussian shape centered about the character "heart", here occurring at pixel position M. To remove artifacts, these index values are thresholded to form a thresholded activation group, with those index values having an amplitude lower than the threshold, here shown as dashed line 720 with a numerical value of 0.2, being rejected and set to zero. The threshold is pre-defined but empirically chosen. Furthermore, if only one pixel position (or a very small number of such positions) has a high amplitude, while the others are below the threshold, then the detected character, being too narrow, is likely to be noise and is rejected and also set to zero.

To reliably determine the pixel position of the character "heart" from the thresholded activation group, a weighted average, here a center-of-mass calculation, of the individual thresholded activation values is calculated. These calculations are diagrammatically depicted in FIGS. 8 and 9.

Figure 8:
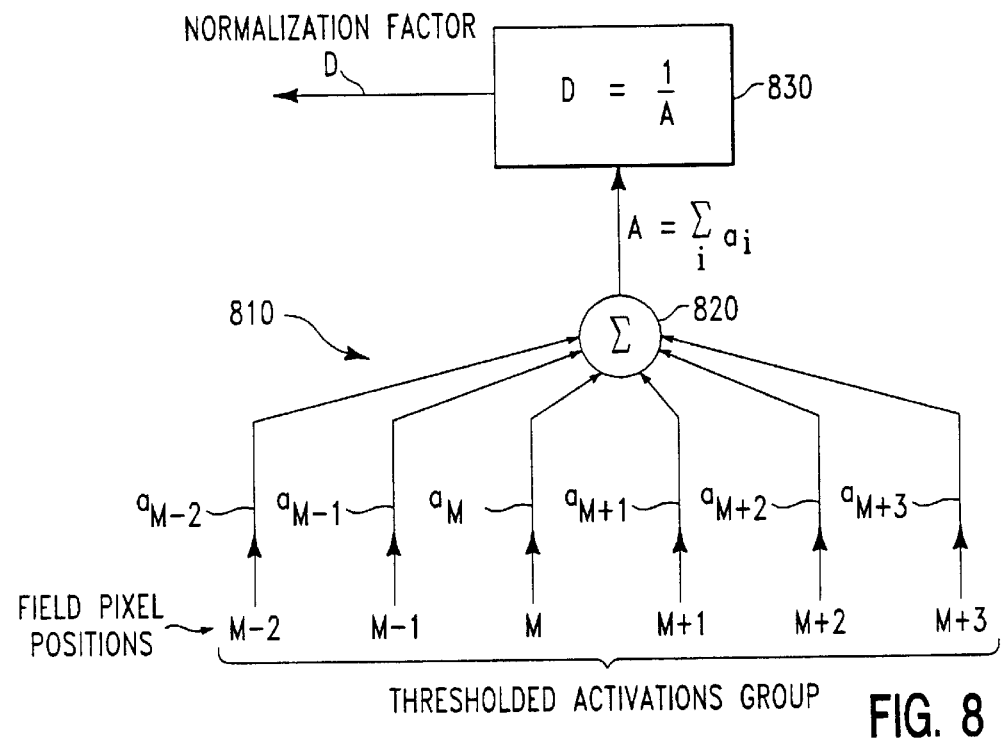
FIG. 8 diagrammatically depicts a process, also occurring within positioning postprocessing block 156 shown in FIG. 1, to determine a normalization factor (D) for the thresholded output activations shown in FIG. 7.

First, as shown in FIG. 8, a normalization factor, D, is determined for the thresholded activation group. This factor is determined by summing the thresholded output activation levels in this group, via leads 810 and summer 820, to form a sum of these values for which the normalization factor is then calculated, through block 830, to be the reciprocal of the sum.

Figure 9:
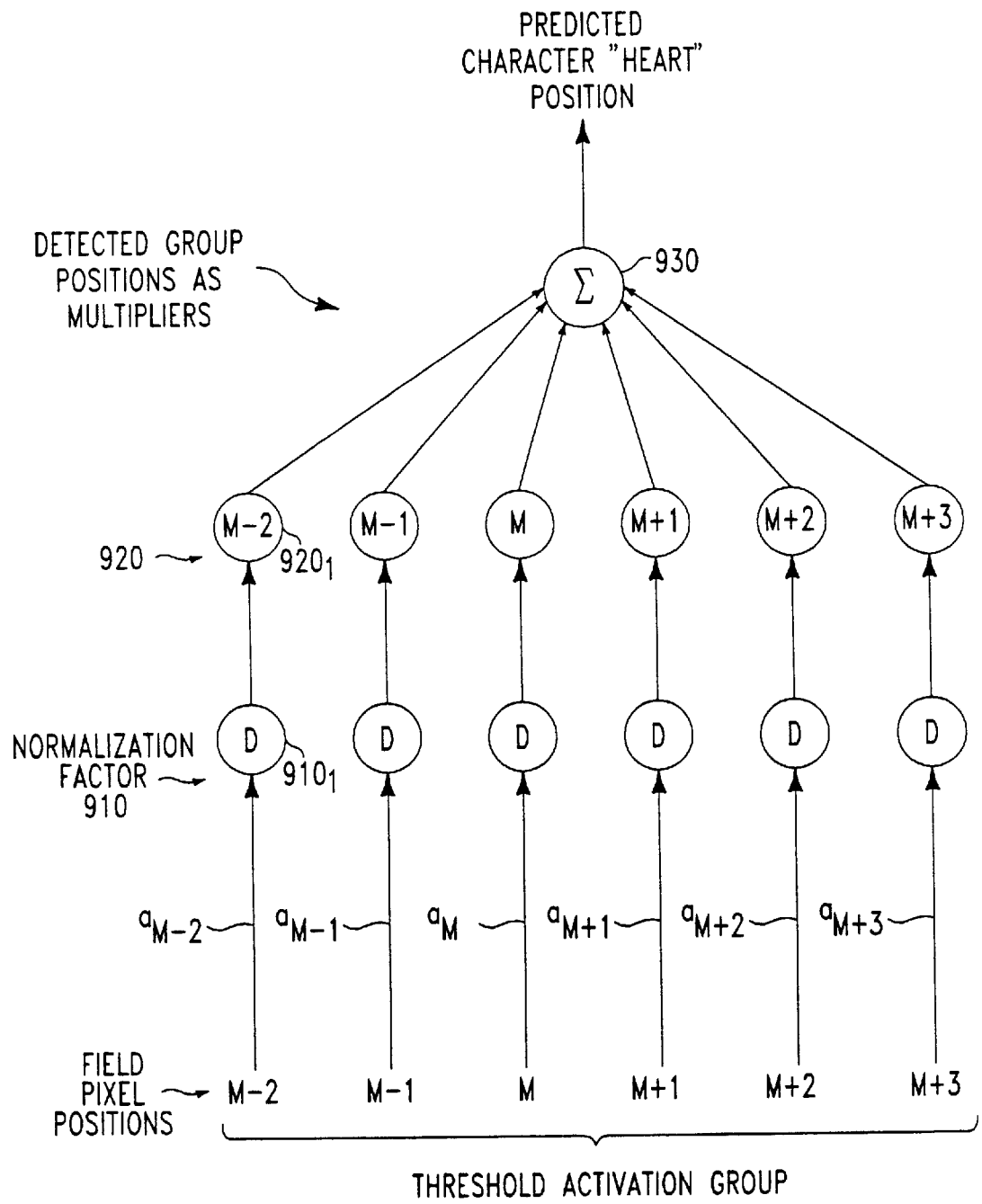
FIG. 9 diagrammatically depicts a process, also occurring within positioning postprocessing block 156 shown in FIG. 1, to generate, from the thresholded activation values shown in FIG. 8, a predicted position for an illustrative character "heart" in the input field.

Once the normalization factor is determined, as shown in FIG. 9, each output activation level is multiplied, via multipliers 910 of which multiplier $920_1$, is illustrative, by the normalization factor, D. The resulting normalized values are then each weighted, through multipliers 920 of which multiplier $920_1$, is illustrative, by a numeric value representing the field pixel position, e.g., here M−2, for that value. Alternatively, the weighted values can be calculated by weighting each of the field-pixel positions by corresponding normalized activation. The resulting weighted values are then all applied to summer 930 which produces a predicted "heart" position for the present character. This predicted "heart" position, in turn, is applied, via lead 159, shown in FIG. 1, to postprocessing block 170 to identify the center of the present character in the field.

Figure 10:
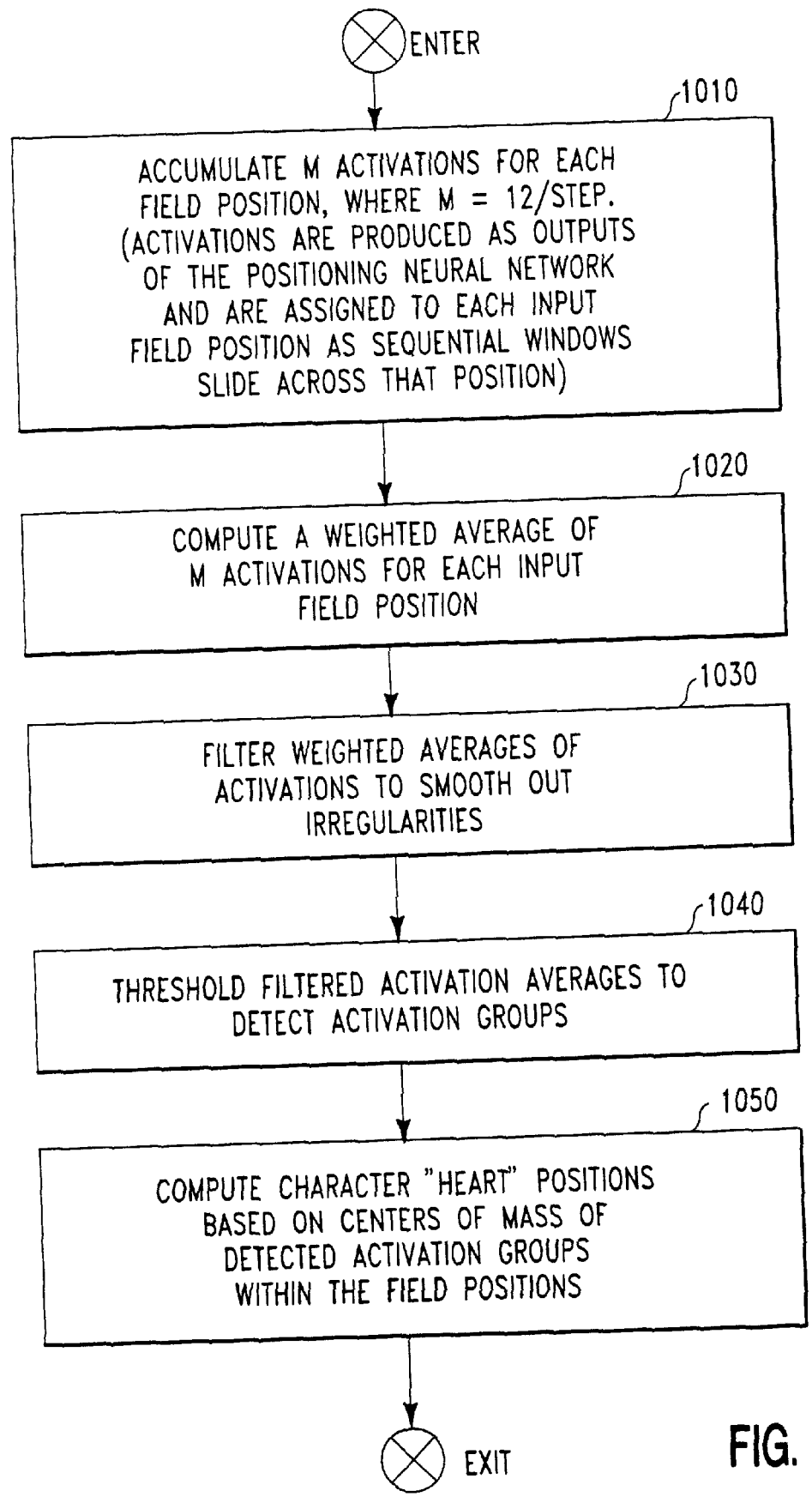
FIG. 10 depicts a flowchart of Positioning Postprocessing Routine 1000 which implements, through a microcomputer, the pixel accumulation and averaging process shown in FIG. 5 and the processes shown in FIGS. 6–9.

Inasmuch as positioning postprocessing block 156 is implemented, as noted above, in software, a flowchart of the relevant operations, implemented by this block and collectively shown by the averaging process in FIG. 5 and that shown in FIGS. 6–9, is depicted in FIG. 10, as Positioning Postprocessing Routine 1000.

Upon entry into routine 1000, execution proceeds to block 1010 which, when executed, accumulates, as discussed above, M separate output activation values, produced by the positioning neural network, for each field pixel position in the input field, where M=12/(step size). Once this occurs, block 1020 executes to compute a weighted average, in the manner discussed above, of these output activation values for each such pixel position in the input field. Thereafter, execution proceeds to block 1030 which filters, also in the manner discussed above, the averaged output activation values to form character-heart index values. These index values are then thresholded, as discussed above and via execution of step 1040, to yield a thresholded activation group. Finally, through execution of step 1050, a character "heart" position, is determined for the current character, in the manner discussed above, based on the thresholded activation group.

To assess the performance of OCR system 5 with respect to the art, the operation of this system has been simulated, through appropriate simulation software executing on a digital computer, against that of the well-known "Saccade"

system, described in Martin et al, "Learning to See Where and What: Training a Net to Make Saccades and Recognize Handwritten Characters" (1993), appears in S. J. Hanson et al (eds.), *Advances in Neural Information Processing Systems*, Volume 5, pages 441–447 (Morgan Kaufmann Publishers, San Mateo, Calif.). Inasmuch as system 5 will be implemented digitally, as discussed above, through both high-speed dedicated programmable digital hardware for various functions, including the neural networks, and a programmed general purpose microcomputer for other functions, the results of the simulation should very accurately predict the performance of system 5, once it is actually implemented in practice. The results of these simulations are shown in FIGS. 11 and 12.

The neural networks were trained, through a variant of conventional back propagation, with corresponding training sets based on 20,000 fields. For character "heart" detection, approximately 300,000 windows starting every fifth field pixel position of each normalized and reassembled field were used. For character recognition, approximately 80,000 characters extracted from the same fields were also used. Since, the positioning neural network was not expected to provide precision higher than one or two pixels, the classification neural network was trained on five copies of the centered characters in a database, with, for each of these characters, corresponding field shifts of −2, −1, 0, 1 and 2 pixels from a common centered position. The fields used for training were drawn from an NIST (National Institute of Standards and Technology) database which contains a set of approximately 273,000 samples of hand-drawn numerals, scanned at 300 pixels/inch, taken from census forms.

As shown both tabularly and graphically in FIG. 11, system 5 out-performed the Saccade system with close to 90% of the character "hearts" found within a one-pixel precision. In contrast, the Saccade system, which does not rely on detecting character "hearts" through use of a separate neural network operating on an array of pixels but rather provides a single node output to indicate whether a character was centered or not, exhibited a one-pixel offset in locating most of the character "hearts". System 5 was found to be quite insensitive to touching characters.

As to character recognition accuracy, system 5, as shown both tabularly and graphically in FIG. 12, consistently out-performed, across all character offsets trained and using the same confidence measurement technique, the Saccade system in accurately recognizing characters, with recognition error being reduced between 41–73% over that produced in the Saccade system.

B. Evidential Confidence Estimation

Now, with the above discussion firmly in mind, I will now address, in detail, my present invention for providing a highly reliable confidence measure for a classified pattern, such as, e.g., for each character classification produced by classification neural network 165. To facilitate understanding, I will preface my discussion by succinctly introducing, to the extent relevant here, the Dempster-Shafer Theory of Evidence, then discuss my application of this theory to generating confidence measures and thereafter conclude by describing the actual implementation of my present invention within system 5 and providing empirically determined performance results for system 5 when using my present invention vis-à-vis use therein of conventional confidence measurement schemes.

1. Dempster-Shafer Theory of Evidence

The Dempster-Shafer Theory of Evidence is a mathematical tool for representing and combining measures of evidences and is particularly useful when knowledge is incomplete and uncertainties exist. only actual knowledge is represented through this theory, thus eliminating any necessity to draw conclusions that would otherwise be premised on ignorance.

In particular, let $\Theta$ be a set of mutually exhaustive and exclusive atomic hypotheses, i.e., $\Theta=\{\theta_1, \ldots, \theta_n\}$, with each $\theta$ being a different hypothesis. For example, if a single dice is being rolled, then $\Theta$ would contain six propositions of the form "the number showing is i" where $1 \leq i \leq 6$; hence N would equal 6 in this example. The set $\Theta$ is commonly referred to as a "frame of discernment". Let $2^\Theta$ denote all the subsets of $\Theta$.

A function, m, is called a basic probability assignment if:

$$m: 2^\Theta \rightarrow [0, 1], m(\phi) = 0, \text{ and } \sum_{A \subseteq \Theta} m(A) = 1 \quad (1)$$

In conventional probability, a measure of probability analogous to a basic probability assignment is associated only with each of the atomic hypotheses, $\theta_n$ (where n=1, ..., N). The probability of each subset of hypotheses would be derived as the sum of the probabilities of its atomic components; hence, nothing exists to express ignorance regarding this subset. Under the Dempster-Shafer Theory, m(A) represents the "belief" which is committed exactly to every (not necessarily atomic) subset A. One can view beliefs as semi-mobile probability masses which can sometimes move from point-to-point but are confined to corresponding subsets of $\Theta$. In other words, m(A) measures the probability mass that is confined to A, but can freely move to every point of A. See Shafer text, cited below. Consequently, the reader can appreciate why m($\Theta$) represents ignorance: this portion of a total belief is not committed to any proper subset of $\Theta$.

Given the above, a simplest possible type of basic probability assignment is a so-called "simple evidence function" that corresponds to a case in which a belief is concentrated in only one subset, F where $F \subseteq \Theta$, F being referred to as a "focal element". If $F \neq \Theta$, then the following definitions can be made for an evidence function: m(F)=s and m($\Theta$)=1−s, and m is zero elsewhere. A so-called "degree of support", i.e., s, represents the "belief" inherent in F while 1−s represents ignorance.

While belief can be expressed in simple or complex evidence functions, the Dempster-Shafer theory provides a rule for combining evidences from two sources; specifically through an orthogonal sum. In particular, a combination $m=m_1 \oplus m_2$ as follows:

$$m(A) = K \cdot \sum_{X \cap Y = A} m_1(X) \cdot m_2(Y) \quad (2)$$

where $$K^{-1} = \sum_{X \cap Y \neq \emptyset} m_1(X) \cdot m_2(Y)$$

Equation (2), though non-intuitively, expresses the notion that a portion of the belief committed to the intersection of two subsets X and Y should be proportional to the product of m(X) and m(Y). This is graphically shown through representation 1300 in FIG. 13.

For further details on the Dempster-Shafer Theory, the reader is referred to two references—both of which are incorporated by reference herein: G. Shafer, *A Mathematical Theory of Evidence* (© 1976: Princeton University Press) and previously and hereinafter referred to as the "Shafer" text, specifically pages 3–78; and J. A, Barnett, "Computational Methods for a Mathematical Theory of Evidence", *Proceedings of the Seventh International Joint Conferences on Artificial Intelligence*, Vancouver, British Columbia, 1981, pages 868–875 and referred to hereinafter as the Barnett publication.

2. Evidence based confidence measures

Given this theory, consider a frame of discernment, $\Theta=\{\theta_1, \ldots, \theta_N\}$ where $\theta_n$ is an hypothesis that a pattern belongs to class n. The activation of an n-th output node, $o_n$, of a neural network, provides information in favor of the corresponding hypothesis $\theta_n$. Hence, the ten output activations of classification neural network 165 can be viewed, on a one-to-one basis, as evidence in favor of ten corresponding hypotheses. The partial belief based on this neural information can be expressed as a simple evidence function:

$$m_n(\theta) = \phi_n, \ m_n(\Theta) = 1 - \phi_n \quad (3)$$

where: $\phi_n$ is a monotonic function of $o_n$. Notwithstanding that a wide variety of monotonic functions can be used for $\phi_n$, a preferred function, which I have empirically determined, will be discussed below in the context of my actual implementation for estimator 175.

These hypotheses are then combined through the orthogonal sum based rule defined by equation (2) above. Implementing this equation directly can consume excessive computational resources, particularly if more than two sources of information are used. In that regard, the Barnett publication teaches an efficient algorithm to implement this Dempster-Shafer rule. In any event, for reader edification, I will derive an equation for implementation directly from equation (2). Inasmuch as all competing hypotheses are atomic, the derivation is straight-forward.

Begin with a case where N=2. The first simple evidence function $m_1$ with its focal element $\theta_1$ has degree of support $\phi_1$. Its only other non-zero value is $m_1(\Theta)=1-\phi_2$. Similarly, $\theta_2$ is the focal element of evidence function $m_2$, with a degree of support Of $\phi_2$ and $m_2(\Theta)=1-\phi_2$. To produce the orthogonal sum, i.e., $m=m_1 \oplus m_2$, beliefs for four subsets of $\Theta$ must be computed: $\emptyset$, $\theta_1$, $\theta_2$ and $\Theta$. These subsets are graphically depicted through representation 1400 shown in FIG. 14. The value $m(\Theta)$ should be proportional to $m_1(\Theta) \cdot m_2(\Theta)$ in order to yield $\Theta$ as the intersection. Similarly, $m(\theta_1)$ should be proportional to $m_1(\theta_1) \cdot m_2(\Theta)$, while $m(\theta_2)$ should be proportional to $m_2(\theta_2) \cdot m_1(\Theta)$. In order to produce $\emptyset$ as an intersection of a subset with non-zero $m_1$-evidence and another subset with non-zero $m_2$-evidence is through $\emptyset = \theta_1 \cap \theta_2$. The corresponding product $\phi_1 \cdot \phi_2$ should be excluded from the normalization constant, K. Finally:

$$m(\theta_1) = K \cdot \phi_1 \cdot (1-\phi_2),$$

$$m(\theta_2) = K \cdot \phi_2 \cdot (1-\phi_1),$$

$$m(\Theta) = K \cdot (1-\phi_1)(1-\phi_2) \quad (4)$$

where:

$$K = \frac{1}{1 - \phi_1 \phi_2}$$

Of course, if both $\phi_1$ and $\phi_2$ are each equal to 1, then equation (4) would be improper since it would involve division by zero. Nevertheless, this result would be correct inasmuch as it would indicate that $m_1$ and $m_2$ are both absolutely confident and flatly contradict each other. In this instance, there is no chance of reconciling the differences therebetween. Alternatively, if only one of the two degrees of support were to equal 1, e.g., $\phi_1$, then $m(\theta_1)=1$, $m(\theta_2)=0$ and $m(\Theta)=0$. In this case, $m_2$ cannot influence an absolutely confident $m_1$.

Alternatively, if neither of the degrees of support were to equal 1, then equation (4) can be transformed into a more convenient form, as follows:

$$m(\theta_{1,2}) = K \cdot \frac{\phi_{1,2}}{1 - \phi_{1,2}} \cdot (1 - \phi_2) \cdot (1 - \phi_2) = K \cdot P \cdot \alpha_{1,2} \quad (5)$$

where: $P = (1 - \phi_1) \cdot (1 - \phi_2)$ and $\alpha_n = \frac{\phi_n}{1 - \phi_n}$ Given equation (5), the following relationships hold:

$$m(\theta_1) = \frac{\alpha_1}{1 + \alpha_1 + \alpha_2} \text{ and } m(\Theta) = \frac{1}{1 + \sum_i \alpha_i} \quad (6)$$

In the general case, with N simple evidence functions with atomic focal elements, their orthogonal sum becomes:

$$m(\theta_n) = \frac{\alpha_n}{1 + \sum_i \alpha_i} \text{ and } m(\Theta) = \frac{1}{1 + \sum_i \alpha_i} \quad (7)$$

Equation (7) can be readily proved through mathematical induction. To do so, assume that this equation is correct for N=n and the equation will be used to combine corresponding evidence function $m_n$ with a simple evidence function $m_{n+1}$, as graphically shown by representation 1500 in FIG. 15. For $\theta_1, \theta_2, \ldots \theta_n$, the resulting value $m(\theta_i)$ should be proportional to $\alpha_i \cdot (1-\phi_{n+1})$. The value $m(\theta_{n+1})$ should be proportional to $\phi_{n+1}$, and $m(\Theta)$ should be proportional to $(1-\phi_{n+1})$. Since $$m(\theta_{n+1}) \propto \phi_{n+1} = \frac{\phi_{n+1}}{1 - \phi_{n+1}} (1 - \phi_{n+1}) = \alpha_{n+1} \cdot (1 - \phi_{n+1}) \quad (8)$$

then, with the exclusion of the common factor $K(1-\phi_{n+1})$, all non-zero values of the resulting evidence function are proportional to $\alpha_i$ for all $\theta_i$, and equal 1 for 0. The new normalization factor 2 equals $$1 + \sum_i \alpha_i$$

Thus, the combined evidence $m(\theta n)$ represents a share of belief (or evidence) associated with each of N competing classification decisions. Equation (7) possesses a number of intuitively attractive properties when used to generate a confidence measure: (a) the highest confidence corresponds to the highest activation output; (i.e., $\alpha_{max}/Z$ ) and for any one activation output: (b) the confidence increases with growth of that particular activation output, and (c) the confidence decreases with the growth of any other activation output(s).

Through use of equation (7) to generate confidence measures based upon all activations, character classifications can be rated and hence rejected/accepted based upon all neural activation outputs, not just the highest and/or next highest activation outputs, thereby yielding more reliable and accurate results than heretofore conventionally occurring.

3. Evidential Confidence Estimator 175

As discussed above, evidential confidence estimator 175, as shown in FIG. 1 and discussed above, provides a confidence measure based on all N neural activation outputs, here ten, produced by classification neural network 165. To do so, each of these outputs, $o_n$, is viewed as providing information for a corresponding atomic hypothesis, $\theta_n$, in equation (3), in an evidence function. The confidence measure is then determined, through implementation of equation (7), as a normalized orthogonal sum of the resulting ten evidence functions.

Estimator 175 is typically implemented in software within the same microcomputer, i.e., microcomputer $190_3$, that implements postprocessor 170. Inasmuch as the programming of microprocessor circuitry is extremely well known in the art, then, for the sake of brevity, the following discussion will only address, at a high-level, those software operations that are pertinent to formulating the evidential confidence measure according to my inventive teachings.

Figure 16A:
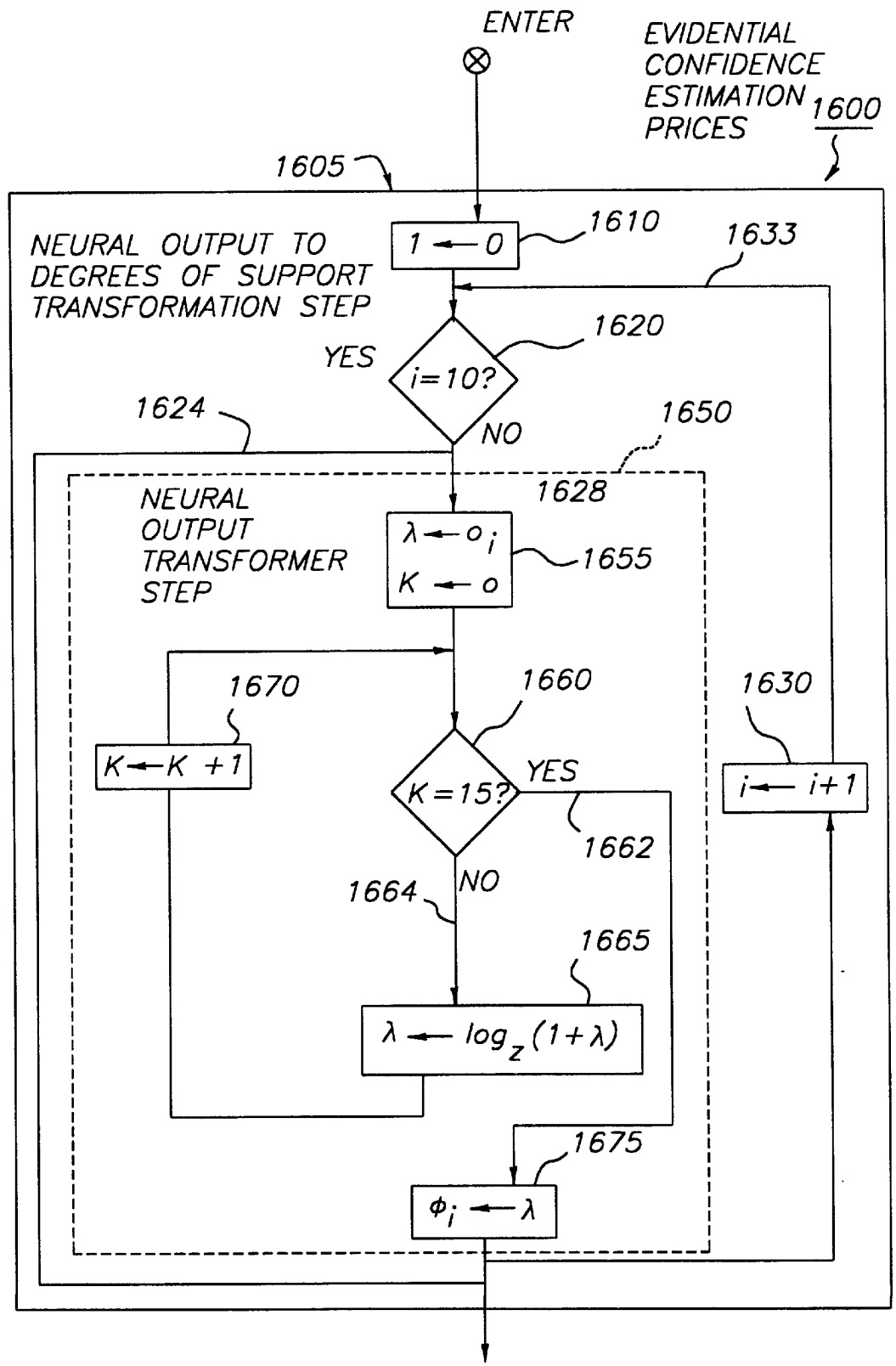
FIGS. 16A and 16B collectively depict a high-level flowchart for Evidential Confidence Estimation Process 1600 that embodies my present invention and is performed within system 5 shown in FIG. 1.
Figure 16B:
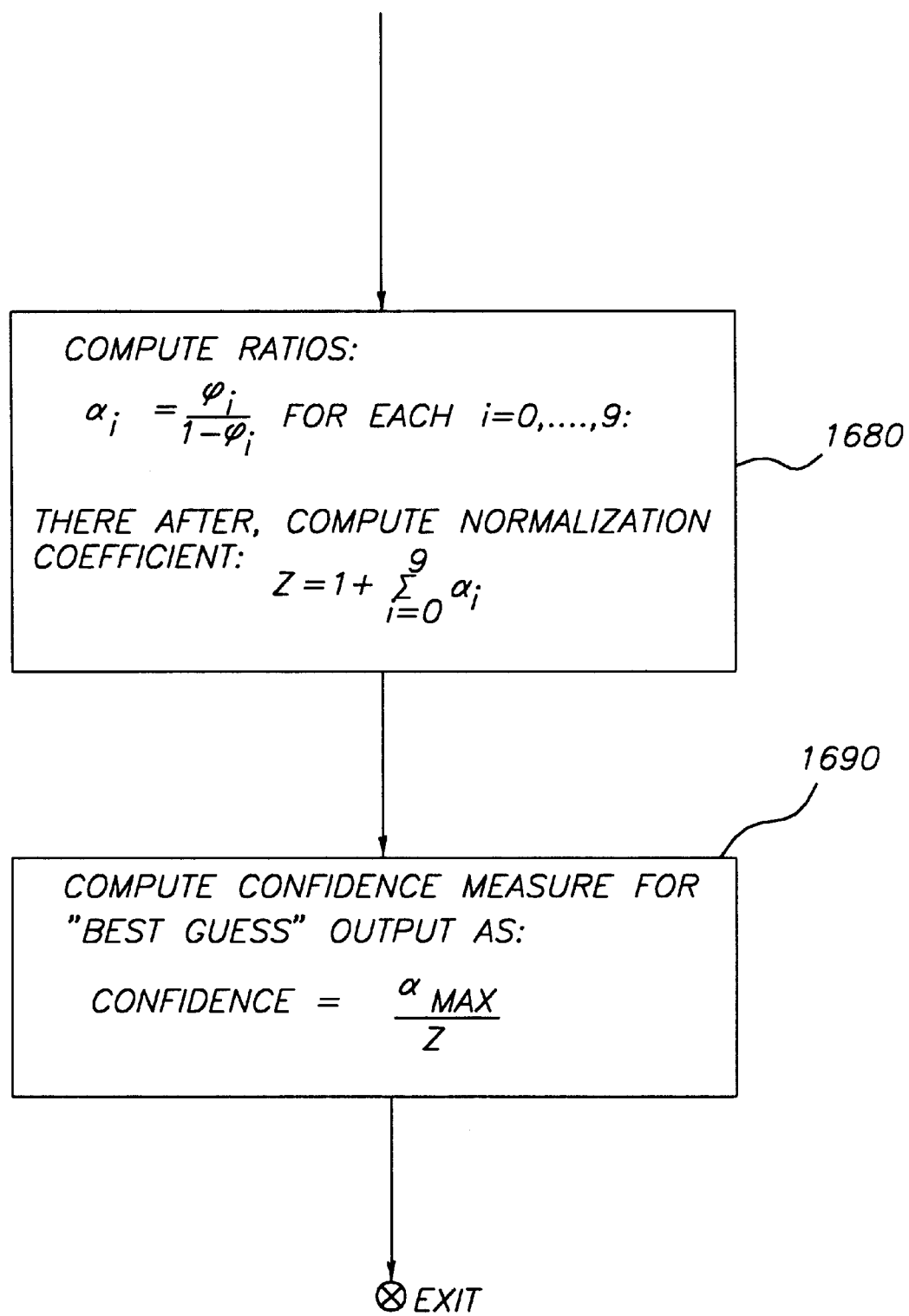

In particularly, FIGS. 16A and 16B collectively depict a high-level flowchart for Evidential Confidence Estimation Process 1600 that executes within microcomputer $190_3$ to implement estimator 175; the correct alignment of these drawing sheets is depicted in FIG. 16.

Upon entry into process 1600, execution first proceeds to block 1605 to transform each neural activation output into a corresponding degree of support. Specifically, within block 1605, execution first proceeds to block 1610 which initializes the contents of iteration counter i to zero. This counter is incremented by one for each successive and different neural output produced by network 165. Thereafter, execution proceeds to decision block 1620 which tests whether the current value of i=10, i.e., whether all ten different neural outputs produced by network 165 have been processed. If the current contents of counter i are less than ten, thereby indicating that one or more such outputs remain to be transformed, then execution proceeds, via NO path 1628 emanating from decision block 1620, to block 1650, and particularly to block 1628 therein. This latter block, when executed, sets variable $\lambda$ equal to the value of neural output $o_i$. In addition, this block also initializes the value of iteration counter k to zero. As noted above, function $\phi_i$ is used to transform each neural activation output, $o_i$, into a corresponding degree of support, here $\phi_i$, for evidence function, $m(\theta_i)$. Function $\phi_i$ must be monotonic within a range of 0 to 1; however, an extremely wide variety of suitable monotonic functions exists and can be used. Through empirical measurements, I have determined that the function $\log_2(1+o_i)$, used as a seed function, produces excellent results particularly if this function is iterated a given number of times. In that regard, I found that any number of iterations between eight and twenty provided particularly good performance though with relatively minor variation occurring as a function of the number of iterations within this range; fifteen iterations appeared to provide the best performance. As such, transformer step 1650 implements a separate fifteen iteration $\log_2(1+o_i)$ function, through execution of blocks 1660–1670, to convert each different neural activation output into a corresponding degree of support value.

In particular, once block 1655 has fully executed, decision block 1660 executes to determine whether the current value of counter k has reached 15. If this counter has not yet reached 15, then decision block 1660 routes execution, via NO path 1664, to block 1665. This latter block, when executed, calculates $\log_2(1+\lambda)$ and stores the result back in variable $\lambda$. This process is repeated 15 times. To accomplish this, once block 1665 has executed, execution proceeds to block 1670 to increment the current value of iteration counter k by one. Execution then loops back to decision block 1660 to test the current value of this iteration counter, and so forth. Once 15 iterations have occurred and hence the contents of iteration counter k have reached 15, then decision block 1660 routes execution, via YES path 1662, to block 1675 which assigns the current value of variable $\lambda$ to degree of support value $\phi_i$. Once this assignment has occurred, execution proceeds to block 1630 which, in turn and when executed, increments iteration counter i by one. Once block 1630 has executed, execution loops back, via path 1633, to decision block 1620 to transform the next successive neural activation output. Once all ten neural activation outputs have been processed, i.e., signified by the contents of i equaling ten, then this decision block routes execution, via YES path 1624, to block 1680. The latter block, when executed, computes the orthogonal sum, through equation (7), for each i=0, ..., 9:

$$\alpha_i = \frac{\phi_i}{1 - \phi_i} \tag{9}$$

and a normalization coefficient, Z, as:

$$Z = 1 + \sum_{i=0}^{9} \alpha_i \tag{10}$$

Once block 1680 has completely executed, block 1690 then executes to compute the confidence measure, CONFIDENCE, as the maximum value of the ten resulting values of $\alpha$, i.e., $\alpha_{max}$, divided by the normalization coefficient, Z. Once this CONFIDENCE value has been generated, execution exits from routine 1600.

Figure 17:
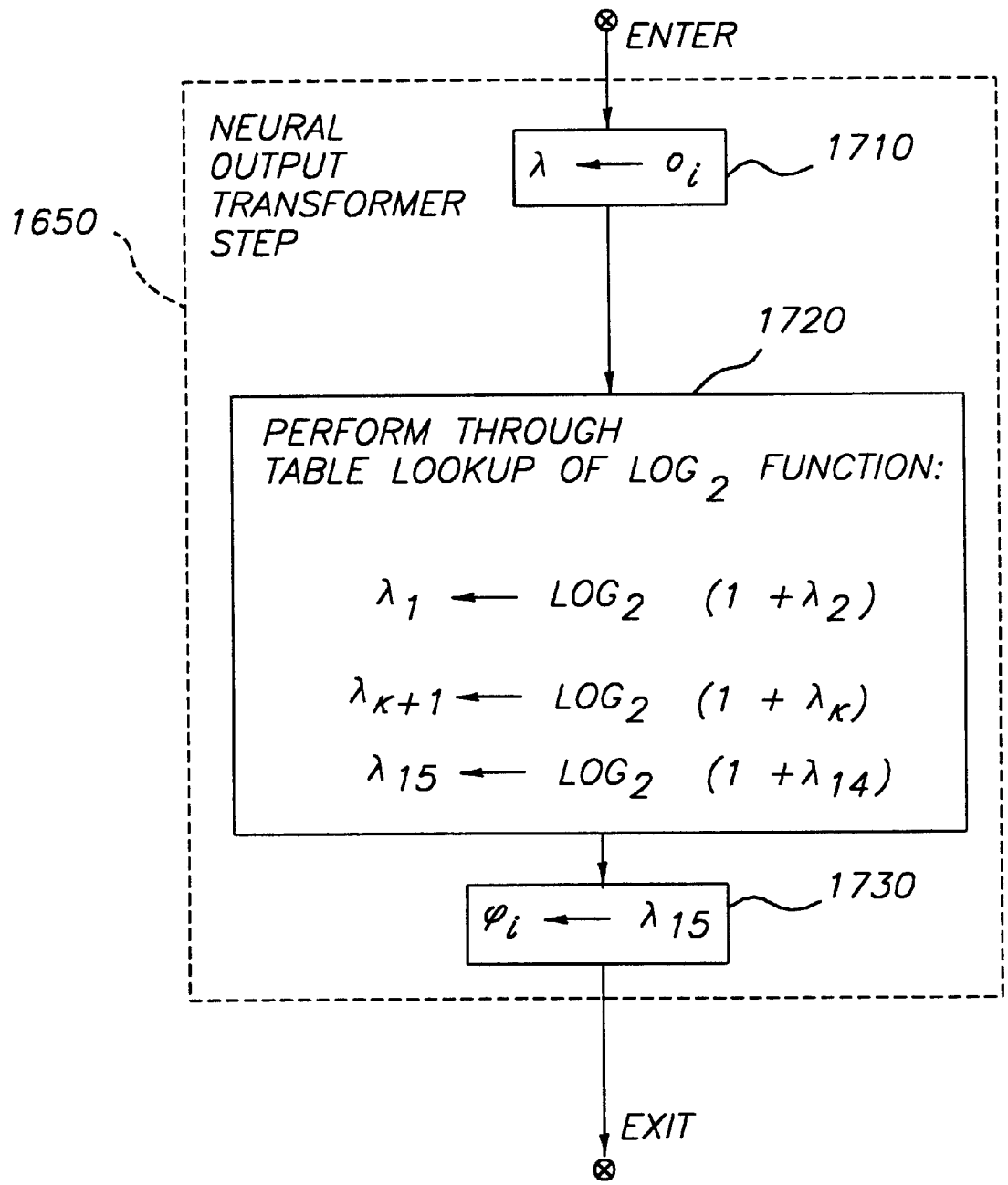
FIG. 17 depicts a high-level flowchart of an alternate embodiment of Neural Output Transformer step 1650 shown in FIGS. 16A and 16B.

FIG. 17 depicts a high-level flowchart of an alternate embodiment of Neural Output Transformer step 1650 shown in FIGS. 16A and 16B. Inasmuch as this alternate embodiment relies on using fifteen successive table look-up operations into a stored $\log_2$ function in memory, this embodiment is computationally much faster to execute than is the embodiment of step 1650 shown in FIGS. 16A and 16B, which relies on separately calculating $\log_2$ each time the function is called, and for that reason is preferred for implementation within microcomputer $190_3$ (shown in FIG. 1). In particular, upon entry into step 1650 shown in FIG. 17 execution first proceeds to block 1710 which, when executed, initializes the value of variable $\lambda_o$ to the value of neural activation output $o_i$. Thereafter, execution proceeds to block 1720 which performs 15 successive look-up operations into a stored $\log_2$ table given the argument $(1+\lambda_k)$ with the result being assigned to $\lambda_{k+1}$ for all k between 0 and 14 inclusive. Either the table is stored with sufficient resolution to preclude the need for interpolation, or conventional interpolation is used where needed, though the steps for doing so are not shown for simplicity. To further increase execution speed, the equation statements are merely repeated fifteen times in order to eliminate code for looping, iteration count k incrementation and count testing. Once block 1720 has fully executed, execution proceeds to block 1730 which assigns the resulting degree of support to variable $\phi_i$. Once this assignment occurs, execution exits from step 1650 shown in FIG. 17.

C. Empirical Performance Results for System 5

To assess the performance of my inventive method, I simulated the performance of system 5, though separately with five different confidence measurement schemes: my inventive method and each of four conventional schemes. These conventional schemes included: the highest activation output (the "HA" scheme), the difference between the highest and next highest activation outputs (the "DA" scheme"), a ratio of the highest and next highest activation outputs (the "RA" scheme), and finally a distance-based rejection criteria (the "DI" scheme). These conventional HA, DA, RA and DI schemes are taught in, respectively: R. Battiti et al, "Democracy in Neural Nets: Voting Schemes for Classification", *Neural Networks*, Vol. 7, No. 4, 1994, pages 691–707; "Martin et al" publication], appears in S. J. Hanson et al (eds.), *Advances in Neural Information Processing Systems*, Volume 5, pages 441–447 (Morgan Kaufmann Publishers, San Mateo, Calif.); and U.S. Pat. No. 5,052,043 (issued Sep. 24, 1991 to R. S. Gaborski; and F. F. Soulie et al, "Multi-Modular Neural Network Architectures: Applications in Optical Character and Human Face Recognition", *International Journal of Pattern Recognition and Artificial Intelligence*, Vol. 7, No. 4, 1993, pages 721–755, specifically pages 728–729.

To do so, I used the handwritten character fields drawn from the NIST database as set forth above. Specifically, neural network 165 was used to generate activation outputs for two sets of approximately 25,000 characters each. To accentuate comparisons among the five test schemes, unambiguous patterns, i.e., those with highest activations above 0.9 and all other activations below 0.1, were excluded from this simulation.

I found approximately 6,500 ambiguous patterns in the first set and approximately 8,000 characters in the second set. The first subset was used to select the best monotonic function to use in transforming the activation outputs into degrees of support functions. By comparing the response of a large number of possible functions with respect to the first set led to choosing the function $\lambda(x)=\log_2(1+x)$, as a seed of a family of transformations, $\lambda^k$, with k equaling 15.

Once this function was selected, as described and implemented above, my inventive evidential confidence estimation process (the "EV" scheme) was used, within system 5, with the second set of characters applied as input to the system. As noted above, separate trials, for purposes of comparison, were also run though through system 5 but with the four corresponding conventional schemes being substituted for my inventive method.

Figure 19:
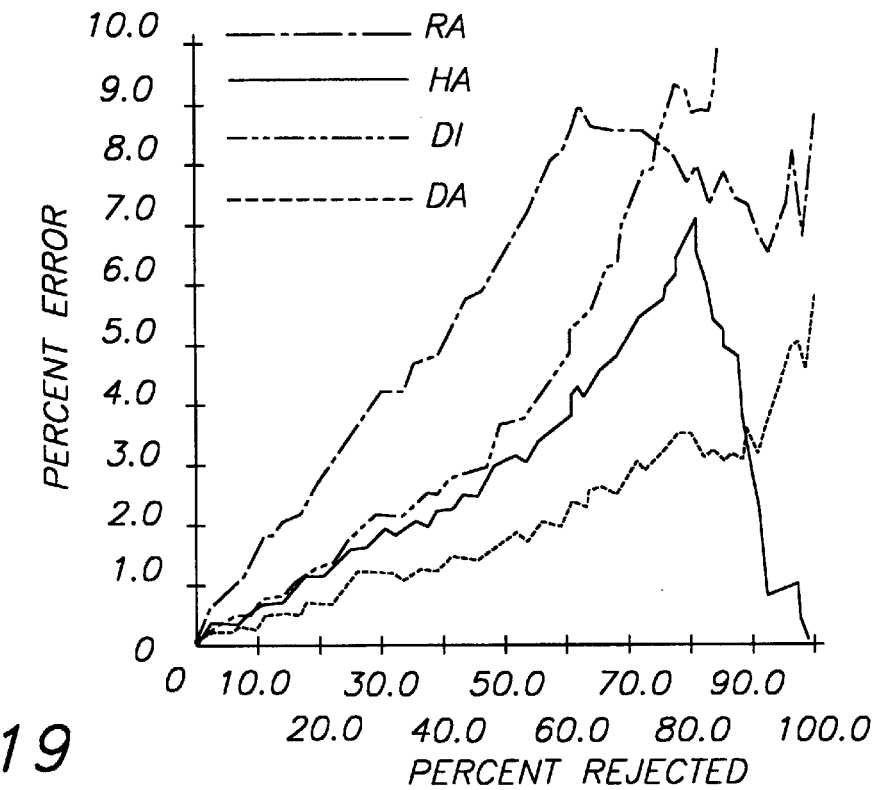
FIG. 19 graphically depicts the percent error of the four conventional rejection processes, as a function of percent rejection, when compared with the data shown in FIG. 18 taken as a baseline.
Figure 20:
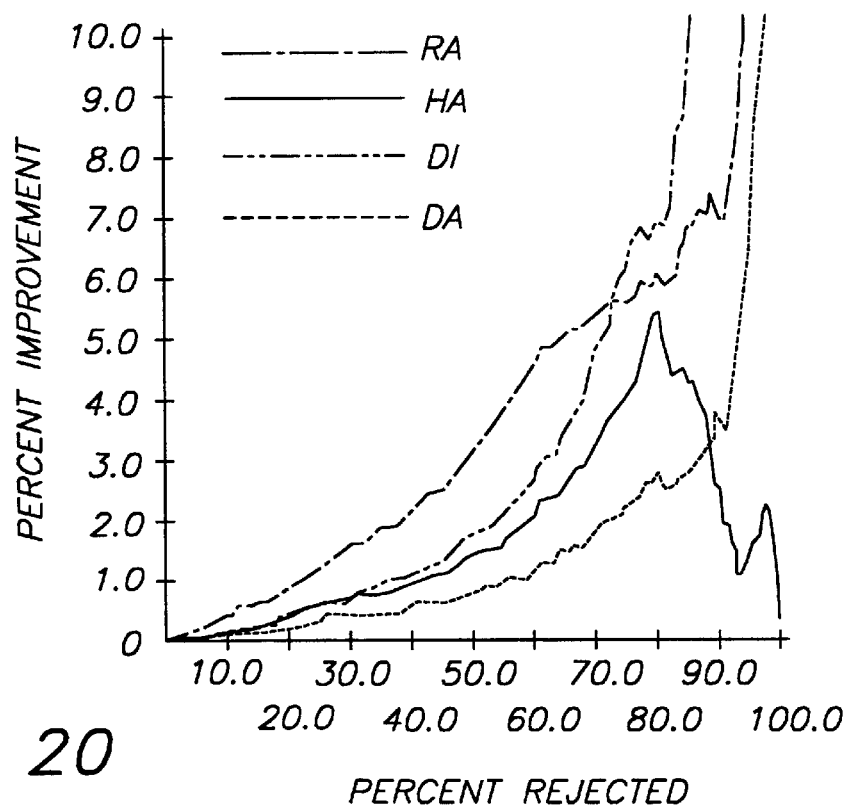
FIGS. 20 graphically depicts the percent improvement provided by my inventive rejection process over the rejection errors, in percent, provided by each of the four conventional rejection processes shown in FIG. 18.

The results of my simulations are graphically shown in FIGS. 18–20. FIG. 18 depicts a comparison of percent error vs. percent rejected for each of the five schemes. As can be seen, my inventive method (labeled as "EV") produced consistently lower error rates than any of the other schemes for all meaningful percentages between 0 and 100%, exclusive. FIGS. 19 and 20 depict these errors in relative terms, with the error for my inventive method being taken as a baseline. In that regard, FIG. 19 depicts the additional (differential) percent error, relative to my inventive method, that resulted for each of the four conventional schemes for each percentage of rejects. FIG. 20 shows the percentage improvement provided by my inventive method over the error provided by each of the four conventional schemes. This improvement is calculated as the difference in error rates divided by the remaining error produced by my inventive method.

As can be seen from FIGS. 18–20, my inventive method consistently provided reduced rejection errors with respect to all four conventional schemes and increased classification accuracies by approximately 15% over the most accurate one of these four schemes.

Although I have discussed my present invention in the context of operating on neural activation outputs provided by, e.g., classification neural network 165 shown in FIG. 1, my invention is directly applicable to use with nearly any arbitrary set of one-class classifiers, whether neural-based or not, in which each classifier produces a separate output for a corresponding class that it is to recognize. All that is required is that a monotonic relationship exists within the classifier between the output value of each of these one-class classifiers, i.e., $o_n$, and the individual confidences, $\phi_n$, in a corresponding hypothesis for that one-class classifier. Based upon the particular characteristics of the one-class classifier, the monotonic function used to transform the classification outputs into corresponding degrees of support would necessarily change from that described above, i.e., $\log_2(1+x)$. In all likelihood, the monotonic function best suited for use with any one particular one-class classifier would be empirically determined. Of course, the implementation of this function, i.e., whether in hardware, software or a combination thereof, would be governed, in good measure, by the particular function itself and various well-known design considerations, such as, e.g., processing speed and circuit complexity. All other aspects of my inventive method would remain essentially unchanged from those described above.

Furthermore, by now, those skilled in the art clearly recognize that although my invention has been described in terms of a system for recognizing handwritten characters, my inventive teachings can nevertheless be applied to systems for recognizing nearly all pre-defined objects produced from any of a wide variety of signal sources, other than just a scanned document, in order to refine rejection/acceptance decisions and thus improve the accuracy of the overall recognition.

Although various embodiments of the present invention have been shown and described in detail herein, many other varied embodiments that incorporate the teachings of the present invention may be easily constructed by those skilled in the art.

INDUSTRIAL APPLICABILITY AND ADVANTAGES

The present invention is not only useful in optical character recognition (OCR) systems but generally in a wide variety of systems that performs pattern recognition. The invention generates a highly reliable confidence measure for use in accepting/rejecting each classified object, such as, e.g., a character classification provided by an OCR system that recognizes handwritten characters.

I claim:

1. Apparatus for recognizing an input pattern as one of a number of different pre-defined patterns, the apparatus comprising:

means for classifying said input pattern as a specific one of said pre-defined (N) patterns, said classifying means generating a plurality of individual signals ($o_i$, where $1 \leq i \leq N$), each of said signals having an activation output level associated with a correspondingly different one of the pre-defined patterns wherein the specific pattern is that one of the pre-defined patterns having, amongst all the signals, a maximum activation output level associated therewith;

means for transforming each of the activation output levels provided by said signals through a pre-defined function into a corresponding degree of support value ($\phi_i$) so as to generate a plurality of degree of support values;

means, responsive to all of the degree of support values, for producing a confidence measure associated with the specific pattern; and output means, responsive to said confidence measure, for determining whether said specific pattern is a valid classification and, in the event the classification is valid, applying said specific pattern to an output terminal as an output pattern, wherein the pre-defined function is a monotonic function, wherein said confidence measure producing means comprises means for yielding said confidence measure as an orthogonal sum of the degree of support values, and wherein said yielding means generates the confidence measure which equals $\alpha_{MAX}/Z$, wherein $$\alpha_i = \frac{\phi_i}{1-\phi_i};$$

$$Z = 1 + \sum_{i=1}^{N} \alpha_i; \text{ and}$$

$\alpha_{MAX}$ is a maximum value of a resulting plurality of values of $\alpha$.

2. The apparatus in claim 1 wherein the classifying means is a neural classifier network.

3. The apparatus in claim 2 wherein the monotonic function is $\lambda \leftarrow \log_2(1+\lambda)$ iterated a pre-defined number of times.

4. The apparatus in claim 3 wherein the neural network comprises: an input layer, a plurality of hidden layers and an output layer.

5. The apparatus in claim 4 wherein a first one of the hidden layers in said neural network is a Gabor layer and each of the remaining hidden layers in the neural network is a trainable layer.

6. The apparatus in claim 3 wherein the output means determines whether the specific pattern is valid by comparing the confidence measure associated therewith to a pre-defined confidence threshold and applies said specific pattern to the output terminal in the event the confidence measure exceeds the pre-defined confidence threshold.

7. An optical character recognition system for recognizing an input character situated within an image field, wherein the image field contains image pixels and said system classifies said input character as one of a plurality of pre-defined characters, the system comprising:

a neural network for classifying said input character as a specific one of said pre-defined (N) characters, said neural network generating a plurality of individual signals ($o_i$, where $1 \leq i \leq N$), each of said signals having a neural activation output level associated with a correspondingly different one of the pre-defined characters wherein the specific pattern is that one of the pre-defined characters having, amongst all the signals, a maximum neural activation output level associated therewith;

means for transforming each of the neural activation output levels provided by said signals through a pre-defined function into a corresponding degree of support value ($\phi_i$) so as to generate a plurality of degree of support values;

means, responsive to all of the degree of support values, for producing a confidence measure associated with the specific pattern; and output means, responsive to said confidence measure, for determining whether said specific pattern is a valid classification and, in the event the classification is valid, applying said specific character to an output terminal as an output character, wherein the pre-defined function is a monotonic function, wherein said confidence measure producing means comprises means for yielding said confidence measure as an orthogonal sum of the degree of support values, and wherein said yielding means generates the confidence measure which equals $\alpha_{MAX}/Z$, wherein $$\alpha_i = \frac{\phi_i}{1-\phi_i};$$

$$Z = 1 + \sum_{i=1}^{N} \alpha_i; \text{ and}$$

$\alpha_{MAX}$ is a maximum value of a resulting plurality of values of $\alpha$.

8. The system in claim 7 wherein the monotonic function is $\lambda \leftarrow \log_2(1+\lambda)$ iterated a pre-defined number of times.

9. The system in claim 8 wherein the neural network comprises: an input layer, a plurality of hidden layers and an output layer.

10. The system in claim 9 wherein a first one of the hidden layers in said neural network is a labor layer and each of the remaining hidden layers in the neural network is a trainable layer.

11. The system in claim 8 wherein the output means determines whether the specific character is valid by comparing the confidence measure associated therewith to a pre-defined confidence threshold and applies said specific character to the output terminal in the event the confidence measure exceeds the pre-defined confidence threshold.

12. A method for recognizing an input pattern as one of a number of different pre-defined patterns, the method comprising the steps of:

classifying said input pattern as a specific one of said pre-defined (N) patterns wherein said classifying step comprises the step of generating a plurality of individual signals ($o_i$, where $1 \leq i \leq N$), each of said signals having an activation output level associated with a correspondingly different one of the pre-defined patterns wherein the specific pattern is that one of the pre-defined patterns having, amongst all the signals, a maximum activation output level associated therewith;

transforming each of the activation output levels provided by said signals through a pre-defined function into a corresponding degree of support value ($\phi_i$) so as to generate a plurality of degree of support values;

producing, in response to all of the degree of support values, a confidence measure associated with the specific pattern; and determining, in response to said confidence measure, whether said specific pattern is a valid classification and, in the event the classification is valid, applying said specific pattern to an output terminal as an output pattern, wherein the pre-defined function is a monotonic function, wherein said confidence measure producing step comprises the step of yielding said confidence measure as an orthogonal sum of the degree of support values, and wherein said yielding step comprises the step of generating the confidence measure which equals $\alpha_{MAX}/Z$, wherein $$\alpha_i = \frac{\phi_i}{1-\phi_i};$$

$$Z = 1 + \sum_{i=1}^{N} \alpha_i; \text{ and}$$

$\alpha_{MAX}$ is a maximum value of a resulting plurality of values of $\alpha$.

13. The method in claim 12 wherein the monotonic function is $\lambda \leftarrow \log_2(1+\lambda)$ iterated a pre-determined number of times.

14. The method in claim 13 wherein the output determining step comprises the steps of:
assessing whether the specific pattern is valid by comparing the confidence measure associated therewith to a pre-defined confidence threshold; and
applying said specific pattern to the output terminal in the event the confidence measure exceeds the pre-defined confidence threshold.

15. In an optical character recognition system for recognizing an input character situated within an image field, wherein the image field contains image pixels and said system classifies said input character as one of a plurality of pre-defined characters, a method comprising the steps of:
classifying, through a neural network, said input character as a specific one of said pre-defined (N) characters, wherein said classifying step comprises the step of generating a plurality of individual signals ($o_i$ where $1 \leq i \leq N$), each of said signals having a neural activation output level associated with a correspondingly different one of the pre-defined characters wherein the specific pattern is that one of the pre-defined characters having, amongst all the signals, a maximum neural activation output level associated therewith;
transforming each of the neural activation output levels provided by said signals through a pre-defined function into a corresponding degree of support value ($\phi_i$) so as to generate a plurality of degree of support values;
producing, in response to all of the degree of support values, a confidence measure associated with the specific pattern; and
determining, in response to said confidence measure, whether said specific pattern is a valid classification and, in the event the classification is valid, applying said specific character to an output terminal as an output character,
wherein the pre-defined function is a monotonic function,
wherein said confidence measure producing step comprises the step of yielding said confidence measure as an orthogonal sum of the degree of support values, and
wherein said yielding step generates the confidence measure which equals $\alpha_{MAX}/Z$, wherein $$\alpha_i = \frac{\phi_i}{1-\phi_i};$$

$$Z = 1 + \sum_{i=1}^{N} \alpha_i; \text{ and}$$

$\alpha_{MAX}$ is a maximum value of a resulting plurality of values of $\alpha$.

16. The method in claim 15 wherein the monotonic function is $\lambda \leftarrow \log_2(1+\lambda)$ iterated a pre-determined number of times.

17. The method in claim 15 wherein the determining and applying step comprises the steps of:
determining whether the specific character is valid by comparing the confidence measure associated therewith to a pre-defined confidence threshold; and
applying said specific character to the output terminal in the event the confidence measure exceeds the pre-defined confidence threshold.

* * * * *